US008262229B2

(12) United States Patent
Nelson

(10) Patent No.: US 8,262,229 B2
(45) Date of Patent: Sep. 11, 2012

(54) MULTI-PROJECTOR DISPLAY SYSTEM CALIBRATION

(75) Inventor: Steve Nelson, San Jose, CA (US)

(73) Assignee: Seiko Epson Corporation, Tokyo (JP)

(*) Notice: Subject to any disclaimer, the term of this patent is extended or adjusted under 35 U.S.C. 154(b) by 415 days.

(21) Appl. No.: 12/728,838

(22) Filed: Mar. 22, 2010

(65) Prior Publication Data

US 2011/0228104 A1 Sep. 22, 2011

(51) Int. Cl.
*G03B 21/14* (2006.01)
*G06K 9/48* (2006.01)

(52) U.S. Cl. ......................... 353/94; 353/121

(58) Field of Classification Search .............. 353/30, 353/69, 94, 121, 122; 348/745; 382/199; 345/1.3

See application file for complete search history.

(56) References Cited

U.S. PATENT DOCUMENTS

| | | | |
|---|---|---|---|
| 6,733,138 B2 | 5/2004 | Raskar | |
| 6,939,011 B2 | 9/2005 | Kobayashi | |
| 7,001,023 B2 | 2/2006 | Lee et al. | |
| 7,146,036 B2 | 12/2006 | An Chang et al. | |
| 7,901,094 B2 * | 3/2011 | Tan et al. | 353/121 |
| 8,042,954 B2 * | 10/2011 | Tan et al. | 353/94 |
| 8,102,332 B2 * | 1/2012 | Nelson et al. | 345/1.1 |
| 8,201,950 B2 * | 6/2012 | Nelson | 353/94 |
| 2005/0001986 A1 | 1/2005 | Matsuda | |
| 2007/0091277 A1 | 4/2007 | Damera-Venkata et al. | |
| 2011/0050887 A1 * | 3/2011 | Nelson | 348/135 |

OTHER PUBLICATIONS

"Stray Light Elimination in Making Projection Display Measurements", Paul A. Boynton and Edward F. Kelley, Flat Panel Display Technology and Display Metrology Conference, San Jose, CA, 1999.
"Automatic Projector Calibration with Embedded Light Sensors", Johnny C. Lee, Paul H. Dietz, Dan Maynes-Aminzade, Ramesh Raskar and Scott E. Hudson, Proceedings of the 17th annual ACM Symposium on User Interface Software and Technology, Santa Fe NM, 2004, (pp. 123-126).
"Seamless Projection Overlaps using Image Warping and Intensity Blending", Ramesh Raskar, Greg Welch, Henry Fuchs, Fourth International Conference on Virtual Systems and Multimedia, Gifu, Japan, Nov. 1998.
"High-Accuracy Stereo Depth Maps Using Structured Light", Daniel Scharstein and Richard Szeliski, IEEE Computer Society Conference on Computer Vision and Pattern Recognition (CVPR 2003), vol. 1, Jun. 2003, (pp. I-195-I-202).
"3D Measurement Technology by Structured Light Using Stripe-Edge-Based Gray Code", H. B. Wu, Y. Chen, M. Y. Wu, C. R. Guan and X. Y. Yu, Journal of Physics: Conference Series 48, International Symposium on Instrumentation Science and Technology, 2006, (pp. 537-541).

* cited by examiner

*Primary Examiner* — William C Dowling

(57) ABSTRACT

A first Gray code technique and a second raster calibration technique can be combined to create a precise mapping between pixel locations of the camera and pixel locations of the projector(s). In one aspect the technique of using the raster calibration images is eliminated by interpolating the projector coordinate information decoded from the Gray code images. In another aspect camera images are processed to reduce errors caused by noise so that text can be displayed without any noticeable misalignment between projectors. In a third aspect, a scale factor is calculated based on the relative height/width of projector regions in the captured calibration images. Calibration images are recalculated using the scale factor to provide greater correspondence between the mapping of a low resolution camera to the high-resolution projectors.

6 Claims, 56 Drawing Sheets

```
private BufferedImage fillColumns(BufferedImage verticalLeft,BufferedImage
verticalRight) { logger.debug("fillColumns In");

final int width = verticalLeft.getWidth();
    final int height = verticalLeft.getHeight();

BufferedImage bufferedImage = new BufferedImage(width, height,
    BufferedImage.TYPE_BYTE_GRAY);

WritableRaster outRaster = bufferedImage.getRaster();
    Raster verticalLeftRaster = verticalLeft.getRaster();
    Raster verticalRightRaster = verticalRight.getRaster();
    Raster maskRaster = maskBufferedImage.getRaster();

int[] pixelVerticalLeft = new int[1];
    int[] pixelVerticalRight = new int[1];
    int[] pixelMask = new int[1];
    int[] pixel255 = new int[1];
    pixel255[0] = 255;

boolean bColumnStart = false;

for (int j = 0; j < height; j++) { bColumnStart = false;
        // First left to right
        for (int i = 0; i < width; i++) {
            verticalLeftRaster.getPixel(i, j, pixelVerticalLeft);
            if (pixelVerticalLeft[0] == 255) {
                verticalRightRaster.getPixel(i, j, pixelVerticalRight);
                if (pixelVerticalRight[0] != 255) {
                    bColumnStart = true;
                }
            }
            else if (bColumnStart == true) {
                verticalRightRaster.getPixel(i, j, pixelVerticalRight);
                if (pixelVerticalRight[0] == 255) {
                    outRaster.setPixel(i, j, pixel255);
                    bColumnStart = false;
                }
                else {
                    maskRaster.getPixel(i, j, pixelMask);
                    if (pixelMask[0] != 0) {
                        outRaster.setPixel(i, j, pixel255);
                    }
                }
            }
        }
```

FIG. 18A

```
        bColumnStart = false;
        // Then right to left
        for (int i = width - 1; i >= 0; i--) {
            verticalRightRaster.getPixel(i, j, pixelVerticalRight);
            if (pixelVerticalRight[0] == 255) {
                verticalLeftRaster.getPixel(i, j, pixelVerticalLeft);
                if (pixelVerticalLeft[0] != 255) {
                    bColumnStart = true;
                    maskRaster.getPixel(i, j, pixelMask);
                    if (pixelMask[0] != 0) {
                        outRaster.setPixel(i, j, pixel255);
                    }
                }
            }
            else if (bColumnStart == true) {
                verticalLeftRaster.getPixel(i, j, pixelVerticalLeft);
                if (pixelVerticalLeft[0] == 255) {
                    //outRaster.setPixel(i, j, pixel255);
                    bColumnStart = false;
                }
                else {
                    maskRaster.getPixel(i, j, pixelMask);
                    if (pixelMask[0] != 0) {
                        outRaster.setPixel(i, j, pixel255);
                    }
                }
            }
        }
    }
    logger.debug("fillColumns Out");
    return bufferedImage;
}
```

FIG. 18B

```
public class GrayCodeValueRange {
    /** start offset location in camera image of gray code
band, 0-based, inclusive */
    private int startCameraOffset;
    /** end offset location in camera image of gray code
band, 0-based, inclusive */
    private int endCameraOffset = -1;
    /** gray code value in range */
    private final int grayCodeValue;
    /** gray code value in previous row or column */
    private int previousGrayCodeValue=-1;
    /** gray code value in next row or column */
    private int nextGrayCodeValue = -1;
    /** 0-based row or column offset in camera image for
this range */
    private final int lineOffset;
    /** true if there is not a continuous run of pixels */
    private boolean gap = false;
    /** type of range in camera image */
    private final LineType lineType;
}
```

FIG. 24

```
public class LayeredPixel {
    /** single gray code value (projector coordinate) for
camera pixel location. */
    private final Integer singleProjectorValue;
    /** multiple gray code values (projector coordinates)
for camera pixel location. */
    private final int[] multiProjectorValues;
}
```

FIG. 27

```
private void interpolateMultiValuesX(final
GrayCodeValueRange grayCodeValueRange, final Direction
direction,final      OctaveNdMatrix
matrix,final int neighborLength) { final int cameraPixelCount = neighborLength <
grayCodeValueRange.getLength() - 1 ?
grayCodeValueRange.getLength() - 1 : neighborLength;
        final int row = grayCodeValueRange.getLineOffset();
// zero based if (direction == Direction.LEFT_TO_RIGHT) { final int startGrayCodeValue =
grayCodeValueRange.getGrayCodeValue();
            final int endGrayCodeValue =
getXEndValue(grayCodeValueRange);
            assert(endGrayCodeValue > startGrayCodeValue);
            assert(endGrayCodeValue >= 0);
            assert(startGrayCodeValue >= 0);
            final int columnStart =
grayCodeValueRange.getStartCameraOffset();  // 0-based,
inclusive
            final int columnEnd = columnStart +
cameraPixelCount;                // 0-based, inclusive final int grayCodeValuesCount = endGrayCodeValue
- startGrayCodeValue + 1;
            assert(grayCodeValuesCount > 0);
            final double grayCodeStepSize =
(double)cameraPixelCount / (double)grayCodeValuesCount;

final int[] grayCodeCameraColumnValues = new
int[grayCodeValuesCount];
            grayCodeCameraColumnValues[0] = columnStart;
            grayCodeCameraColumnValues[grayCodeValuesCount-
1] = columnEnd;
            for (int i=1; i < grayCodeValuesCount-1; i++) {
                grayCodeCameraColumnValues[i] =
(int)Math.round((double)columnStart + (grayCodeStepSize *
(double)i));
                assert(grayCodeCameraColumnValues[i] >= 0);
            } checkPixelRange(grayCodeCameraColumnValues,columnStart,colum
nEnd);

createLayeredPixelsX(row,grayCodeCameraColumnValues,startGra
yCodeValue,endGrayCodeValue);
        }
        else if (direction == Direction.RIGHT_TO_LEFT) {
```

FIG. 28

```
            // Only used for left edge
            final int startGrayCodeValue =
grayCodeValueRange.getGrayCodeValue() == 0 ? 1 :
grayCodeValueRange.getGrayCodeValue();
            final int endGrayCodeValue =
getXEndValue(grayCodeValueRange);
            if (endGrayCodeValue <= startGrayCodeValue) {
                logger.debug("break");
            }
            assert(endGrayCodeValue > startGrayCodeValue);
            assert(endGrayCodeValue >= 0);
            assert(startGrayCodeValue >= 0);
            final int columnEnd =
grayCodeValueRange.getEndCameraOffset();      // 0-based,
inclusive
            final int columnStart = columnEnd -
cameraPixelCount;                   // 0-based, inclusive
            //final int columnStart =
grayCodeValueRange.getStartCameraOffset();  // 0-based,
inclusive
            final int grayCodeValuesCount = endGrayCodeValue
- startGrayCodeValue + 1;
            assert(grayCodeValuesCount > 0);
            final double grayCodeStepSize =
(double)cameraPixelCount / (double)grayCodeValuesCount;
            final int[] grayCodeCameraColumnValues = new
int[grayCodeValuesCount];
            grayCodeCameraColumnValues[0] = columnStart;
            grayCodeCameraColumnValues[grayCodeValuesCount-
1] = columnEnd;
            for (int i=grayCodeValuesCount-2; i >= 1; i--) {
                grayCodeCameraColumnValues[i] =
(int)Math.round((double)columnEnd - (grayCodeStepSize *
(double)(grayCodeValuesCount - (i +
1))));
                assert(grayCodeCameraColumnValues[i] >= 0);
            } checkPixelRange(grayCodeCameraColumnValues,columnStart,colum
nEnd);

createLayeredPixelsX(row,grayCodeCameraColumnValues,startGra
yCodeValue,endGrayCodeValue);
        }
        else {
            final String message = "interpolateMultiValuesX
invalid direction=" + direction + " displayNum=" +
jobOptions.getDisplayNum();
            logger.error(message);
            throw new IllegalStateException(message);
        }
    }
```

FIG. 29

```
private void createLayeredPixelsX(final int row,final int[]
cameraColumnValues,final int startGrayCodeValue,final int
endGrayCodeValue) { final int cameraColumnValuesCount =
cameraColumnValues.length;
        int previousCameraColumnValue = cameraColumnValues[0];
        int currentOffset = 0;
        int i;
        for (i=1; i < cameraColumnValuesCount; i++) { if (cameraColumnValues[i] !=
previousCameraColumnValue) { if (i - currentOffset == 1) {
                    // single value
                    assert(startGrayCodeValue + currentOffset
<= projectorWidth);

processSingleLayeredPixel(startGrayCodeValue + currentOffset,
row, previousCameraColumnValue, layeredPixelImageX);
                }
                else {
                    // multivalues
                    final int grayCodeValue =
startGrayCodeValue + currentOffset;
                    final int count = i - currentOffset;
                    assert(grayCodeValue + count <=
projectorWidth);

processMultiLayeredPixel(grayCodeValue,count,row,previousCamer
aColumnValue, layeredPixelImageX);
                } previousCameraColumnValue =
cameraColumnValues[i];
                currentOffset = i;
            }
        }

// process last element
        if (i - currentOffset == 1) {
            // single value
            processSingleLayeredPixel(endGrayCodeValue, row,
previousCameraColumnValue, layeredPixelImageX);
        }
        else {
            // multivalues
            final int grayCodeValue = startGrayCodeValue +
currentOffset;
            final int count = i - currentOffset;

processMultiLayeredPixel(grayCodeValue,count,row,previousCamer
aColumnValue, layeredPixelImageX);
        }
    }
```

FIG. 30

```
        final int[][] projectorCoordsX = new
int[projectorHeight][projectorWidth];
        final int[][] projectorCoordsY = new
int[projectorHeight][projectorWidth];

for (int i=0; i < cameraHeight; i++) {
            for (int j=0; j < cameraWidth; j++) {
                final LayeredPixel columnPixel =
layeredPixelImageX[i][j];
                final LayeredPixel rowPixel =
layeredPixelImageY[i][j];

if ((rowPixel != null) && (columnPixel != null)) {
                    final VPMPoint[] pointArray =
getLayeredPoints(rowPixel,columnPixel);

for (int k=0; k < pointArray.length; k++) {
                        final VPMPoint vpmPoint = pointArray[k];
                        if (vpmPoint.getRow() - 1 < projectorHeight)
{
                            if (vpmPoint.getColumn() - 1 <
projectorWidth) {
                                projectorCoordsX[vpmPoint.getRow()-
1][vpmPoint.getColumn()-1] = j;
                                projectorCoordsY[vpmPoint.getRow()-
1][vpmPoint.getColumn()-1] = i;
                            }
                            else {
                                final String message = "process
projector column too large vpmPoint=" + vpmPoint + " camera row=" +
i + "                    column=" + j;
                                logger.debug(message);
                                throw new
IllegalStateException(message);
                            }
                        }
                        else {
                            final String message = "process
projector row too large vpmPoint=" + vpmPoint + " camera row=" + i +
" column=" + j;
                            logger.debug(message);
                            throw new
IllegalStateException(message);
                        }
                    }
                }
                else if (rowPixel == null) {
                    logger.debug("process camera pixel has null row
projector value camera row=" + i + " column=" + j);
                }
                else if (columnPixel == null) {
                    logger.debug("process camera pixel has null
column projector value camera row=" + i + " column=" + j);
                }
                else {
                    logger.debug("process camera pixel has null row
and column projector value camera row=" + i + " column=" + j);
                }
            }
        }
```

FIG. 31

```
    private VPMPoint[] getLayeredPoints(final LayeredPixel
rowPixel, final LayeredPixel columnPixel) {
        VPMPoint[] pointArray = null;
        if ((rowPixel.isSingleProjectorValue() == true) &&
(columnPixel.isSingleProjectorValue() == true)) {
            pointArray = new VPMPoint[1];
            pointArray[0] = new
VPMPoint((short)rowPixel.getSingleProjectorValue(),(short)colu
mnPixel.getSingleProjectorValue());
        }
        else if (rowPixel.isSingleProjectorValue() == true) {
            final int count =
columnPixel.getProjectorValueCount();
            // Only row pixel is single, column has multiple
values
            pointArray = new VPMPoint[count];
            for (int i=0; i < count; i++) {
                pointArray[i] = new
VPMPoint((short)rowPixel.getSingleProjectorValue(),
(short)columnPixel.getMultiProjectorValue(i));
            }
        }
        else if (columnPixel.isSingleProjectorValue() == true)
{
            final int count =
rowPixel.getProjectorValueCount();
            // Only column pixel is single, row has multiple
values
            pointArray = new VPMPoint[count];
            for (int i=0; i < count; i++) {
                pointArray[i] = new
VPMPoint((short)rowPixel.getMultiProjectorValue(i),
(short)columnPixel.getSingleProjectorValue());
            }
        }
        else {
            // row and column pixels have different counts
            final int rowCount =
rowPixel.getProjectorValueCount();
            final int columnCount =
columnPixel.getProjectorValueCount();
            pointArray = new VPMPoint[rowCount * columnCount];

int offset = 0;
            for (int i=0; i < rowCount; i++) {
                for (int j=0; j < columnCount; j++) {
                    pointArray[offset] = new
VPMPoint((short)rowPixel.getMultiProjectorValue(i),
(short)columnPixel.getMultiProjectorValue(j));
                    ++offset;
                }
            }
        }
        return pointArray;
    }
```

FIG. 32

```
private final TreeSet<LastOffset> lastLineEven = new
TreeSet<LastOffset>(new LastOffsetComparator());
private final TreeSet<LastOffset> lastLineOdd = new
TreeSet<LastOffset>(new LastOffsetComparator());
```

FIG. 41

```
public static class LastOffset {
        public final int edge1Offset;
        public final int edge2Offset;
        public final double edge1Average;
        public final double edge2Average;
        public final boolean erasedEdge1;

public LastOffset (final int edge1Offset,final int
edge2Offset,final double edge1Average,final double
edge2Average,final boolean erasedEdge1) {
                this.edge1Offset = edge1Offset;
                this.edge2Offset = edge2Offset;
                this.edge1Average = edge1Average;
                this.edge2Average = edge2Average;
                this.erasedEdge1 = erasedEdge1;
        }

@Override
        public String toString() {
            StringBuilder sb = new StringBuilder();
            sb.append("edge1Offset=").append(edge1Offset);
            sb.append(" edge2Offset=").append(edge2Offset);
            sb.append("
edge1Average=").append(edge1Average);
            sb.append("
edge2Average=").append(edge2Average);
            sb.append(" erasedEdge1=").append(erasedEdge1);
            return sb.toString();
        }
    }
```

FIG. 42

```
private EraseEdge findEdgeToErase(final int
edge1Offset,final int rowOrColumn) {
        EraseEdge eraseEdge= EraseEdge.EDGE1;

logger.debug("findEdgeToErase In edge1Offset=" +
edge1Offset);

final LastOffset lastOffset = new
LastOffset(edge1Offset,-1,0.0,0.0,false);
        TreeSet<LastOffset> lastLine = null;

if (rowOrColumn % 2 == 0) {
            lastLine = lastLineOdd;
        }
        else {
            lastLine = lastLineEven;
        }

// use previous odd row set
        final LastOffset greaterThan =
lastLine.ceiling(lastOffset);
        final LastOffset lessThan =
lastLine.floor(lastOffset);
        if ((greaterThan == null) && (lessThan == null)) {
            final String message = "findEdgeToErase greater
than and less than equal null edge1Offset=" + edge1Offset;
            logger.error(message);
            eraseEdge = EraseEdge.NONE;
            dumpLastLine(lastLine);
        }
        else if ((greaterThan == null) && (lessThan !=
null)) {
            eraseEdge = lessThan.erasedEdge1 ?
EraseEdge.EDGE1 : EraseEdge.EDGE2;
        }
        else if ((greaterThan != null) && (lessThan ==
null)) {
            eraseEdge = greaterThan.erasedEdge1 ?
EraseEdge.EDGE1 : EraseEdge.EDGE2;
        }
        else {
            logger.debug("findEdgeToErase
greaterThan.edge1Offset=" + greaterThan.edge1Offset + "
lessThan.edge1Offset=" + lessThan.edge1Offset);
            final int greaterThanDiff =
Math.abs(greaterThan.edge1Offset - edge1Offset);
```

FIG. 43A

```
            final int lessThanDiff =
Math.abs(lessThan.edge1Offset - edge1Offset);
            if ((greaterThanDiff < LAST_OFFSET_RANGE) &&
(lessThanDiff < LAST_OFFSET_RANGE)) {
                if (greaterThanDiff < lessThanDiff) {
                    eraseEdge = greaterThan.erasedEdge1 ?
EraseEdge.EDGE1 : EraseEdge.EDGE2;
                }
                else {
                    eraseEdge = lessThan.erasedEdge1 ?
EraseEdge.EDGE1 : EraseEdge.EDGE2;
                }
            }
        }
        logger.debug("findEdgeToErase Out eraseEdge1=" +
eraseEdge);
        return eraseEdge;
    }
```

FIG. 43B

```
        final int middleRow = imageHeight / 2;
            for (int row=middleRow; row >= 0; row--) {
                for (int column=0; column < imageWidth;
column++) {
                    processColumn(row,column);
                }
                // We add to even set on even rows, add to
odd set on odd rows
                if (row % 2 == 0) {
                    lastLineOdd.clear();
                }
                else {
                    lastLineEven.clear();
                }
            } lastLineEven.clear();
            lastLineOdd.clear();

for (int row=middleRow+1; row < imageHeight;
row++) {
                for (int column=0; column < imageWidth;
column++) {
                    processColumn(row,column);
                }
                // We add to even set on even rows, add to
odd set on odd rows
                if (row % 2 == 0) {
                    lastLineOdd.clear();
                }
                else {
                    lastLineEven.clear();
                }
            }
```

FIG. 45

```
public class TPrimal {
    /** Check for maximum number of points */
    private static final int POINT_MAX = 100;
    /** contains projectorRows * projectorColumns of Element
objects */
    private Element[] matrix;
    /** number of projector rows */
    private int projectorRows;
    /** number of projector columns */
    private int projectorColumns;
    /** total number of elements (rows * columns) */
    private int elements;

public TPrimal(final int projectorRows,final int
projectorColumns) {
        this.projectorRows = projectorRows;
        this.projectorColumns = projectorColumns;
        this.elements = projectorRows * projectorColumns;
        this.matrix = new Element[elements];
    }

```
public class Element {
    /** Used for consistency check.  If more coordinates,
warn user. */
    public static final int  MAX_COORDINATES = 20;
    /** Intensity value set for non-overlapped regions.  For
regions in the overlapped area, the value    ranges
       *  from 0.0 to 9.9999.  Note that this is not 100%
accurate way of finding areas as we crop the distance
       *  ramps to fit in the largest bounding rect.  This
causes areas outside bounding rect to be marked
       *  as a non overlap intensity. */
    public static final double NON_OVERLAP_INTENSITY = 1.0;
    /** Projector pixel this element describes, 1 based */
    private final VPMPoint projectorPoint;
    private final Vector<CameraPoint> cameraPoints = new
Vector<CameraPoint>(1);

/**
     * Constructor
     *
     * @param row 1-based projector row
     * @param column 1-based projector column
     */
    public Element(final int row, final int column) {
        if ((row < 1) || (column < 1)) {
            throw new IllegalArgumentException("Element
invalid row/col values row=" + row + " c    olumn=" +
column);
        }
        projectorPoint = new
VPMPoint((short)row,(short)column);
    }
    ...
}
```

FIG. 51

```
public class CameraPoint {
    /** one based, camera coordinates */
    private VPMPoint cameraCoord;
    /** blending ramp number, may be null */
    private Double intensity;
    /** black point values for this camera point, immutable
*/
    private BlackPoint blackPoint;
    /** blending ramp number for this camera point */
    private Integer blendingRampNumber;

public CameraPoint(final VPMPoint cameraCoord) {
        this.cameraCoord = cameraCoord;
    }
...
}
```

FIG. 52

```
    public void scaleTPrimal(final TPrimal primal) throws
IOException {
        logger.debug("scaleTPrimal In");
        assert(primal != null);
        assert(xWarpFile != null);
        assert(yWarpFile != null);

final boolean scaleMatrix =
(jobOptions.isScaleMatrix() == true) ;

if (scaleMatrix == false) {
            logger.debug("scaleTPrimal not scaling primal
scaleMatrix=" + jobOptions.isScaleMatrix() +          "
superbright=" + jobOptions.isSuperBrightMode());
            return;
        } printMinMax();
        for (int i = 0; i < projectorWidth; i++) {
            for (int j = 0; j < projectorHeight; j++) { final double cameraXValue =
xWarpFile.getCameraValue(j,i);
                final double cameraYValue =
yWarpFile.getCameraValue(j,i);
```

FIG. 53A

```
                    if ((cameraXValue >= 0) && (cameraYValue >=
0)) {
                        try {
                            // Camera coordinates are 1-based
                            final int
cameraXValueInt=(int)Math.round(cameraXValue) + 1;
                            final int
cameraYValueInt=(int)Math.round(cameraYValue) + 1;
                            final Element element =
primal.getElement(j + 1, i + 1);
                            if (element != null) {
                                final int cameraCoordinateCount
= element.getCameraCoordinateCount();
                                if (cameraCoordinateCount == 1)
{
                                    final VPMPoint vpmPoint =
new VPMPoint((short)cameraYValueInt,
       (short)cameraXValueInt);

element.setCameraCoordinate(0, vpmPoint);
                                }
                            }
                            else {
                                final String message =
"scaleTPrimal element is null  row=" + (j+1) + "
    column=" + (i+1);
                                logger.error(message);
                                throw new
IllegalStateException(message);
                            }
                        }
                        catch (ArrayIndexOutOfBoundsException e)
{
                            logger.error("scaleTPrimal array
exception accessing row=" + (cameraYValue +
     1) + " col=" + (cameraXValue + 1) + " matrix rows=" +
                        projectorMask.rows() + " cols=" +
projectorMask.columns());
                            throw e;
                        }
                    }
                }
            }
        }
        logger.debug("scaleTPrimal Out");
    }
```

FIG. 53B

MULTI-PROJECTOR DISPLAY SYSTEM CALIBRATION

CROSS-REFERENCE TO RELATED APPLICATIONS

This application is related to commonly assigned U.S. patent application Ser. No. 12/549,011, filed Aug. 27, 2009, which is hereby incorporated by reference in its entirety.

BACKGROUND

1. Field of Invention

The present invention relates generally to multi-projector display systems. More particularly, the present invention relates to accurate calibration of the system during registration of the each of the multiple projectors.

2. Background

With an ever growing desire to see more information with better quality, large-screen displays have become quite popular. Increasing screen resolutions and sizes are continually emerging and made available in televisions, computer monitors, and other video devices. Until recently, large screen displays were typically too costly, physically unwieldy, or simply unavailable. Video projectors provided one solution, enabling a wide range of communication and entertainment functions by offering a significantly greater display area relatively inexpensively. These devices have found application in conference rooms for presentations, home theaters, classroom training, and advertising billboard displays.

Similar to other video device technologies, video projectors continue to advance their displayable pixel resolution and light output. Today commodity projectors are brighter, offer better quality, and are often less expensive than those of prior years. Highly portable projectors (in both weight and size) are also becoming readily available. No longer do commodity projectors remain constrained to dimly lit rooms with well prepared display surfaces. A video projector's small physical size relative to its large projection output therefore remains appealing.

Even with these improvements, however, it is still difficult or impossible for a single commodity projector to achieve very high resolutions, project over vast areas, or create bright projections on very bright surface areas (for example, near day lit windows). Applications demanding such display qualities, however, are becoming more desirable. The benefits of increased resolution, brightness, and larger display surface area have proven useful for reaching larger audiences and providing full-scale life-sized immersive environments. Unfortunately, construction of such large displays is complex and costly.

One common technique, such as grouping multiple projectors together and tiling their projection output to produce large screen displays of any desired size, presents challenging problems with registration (that is, alignment of projector pixels). Color and luminosity variance across separate devices and even within a given device is difficult to correct. Minor shape or geometric inconsistencies of the display surface can also hinder adequate results. Projector lumens, or light output, may not be adequate for brighter locations. Synchronizing content delivery to the individual components forming in the larger display are additional hurdles to solve. Some of these problems apply to single-projector displays as well.

Solutions to some of these system problems take many forms. Many require precise pixel and color alignment using manual methods that require physical adjustment of the projector placement. If the output pixels from one projector are not close enough to those from another projector, a visible gap may occur between the projections on the composite display. Likewise, overlapping pixels across projectors produce bright seams that are also objectionable. High-end projectors with specialized lens optics or edge blending/blurring filters may be available to reduce some of these problems, but are far from optimal.

Specialized projectors and mounting hardware, measurement tools, and tedious calibration methods are additional requirements that add to the resource costs and complexities of physical projector alignment which can become too demanding for the average user. The advanced skills and time requirements are more than most will invest. In many configurations, physical alignment may even be impossible using projectors with limited optic pathways, or with even slightly irregular display surfaces. When changes are necessary to replace failed lamps, the calibration methods often need repeating.

What is needed is a system that provides an easy calibration and playback mechanism offering the typical user an automated method to create a composite display from one or more commodity projectors, even in the presence of high ambient light levels. This method should offer a relatively quick one-time calibration function to be performed once after casual projector placement or changes.

SUMMARY OF INVENTION

In a prior embodiment of the present invention, a first Gray code technique and a second raster calibration technique are combined to create a precise mapping between pixel locations of the camera and pixel locations of the projector(s). In a present, first embodiment of the invention the technique of using the raster calibration images is eliminated by interpolating the projector coordinate information decoded from the Gray code images. This saves processing time.

While certain techniques of the present invention work well for displaying video or still images, text requires even more precision. In a second embodiment of the invention, camera images are processed to reduce errors caused by noise so that text can be displayed without any noticeable misalignment between projectors.

In a third embodiment of the invention, a scale factor is calculated based on the relative height/width of projector regions in the captured calibration images. Calibration images are recalculated using the scale factor to provide greater correspondence between the mapping of a low resolution camera to the high-resolution projectors.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 18A-B show example code for reproducing the stripes based on the enhanced lines.

FIG. 24 shows example code for defining the GrayCodeValueRange class.

FIG. 27 shows example code for defining the LayeredPixel class.

FIGS. 28 and 29 show the example code for interpolate MultiValuesX( ).

FIG. 30 shows example code for creating an array of the Gray code values to span the start and end camera coordinate range.

FIG. 31 shows example code for the loop that processes the LayeredPixel object matrix to create two projector matrices that contain the respective x and y coordinates of the camera coordinate to which the projector coordinate is mapped.

FIG. 32 show the example code for getLayeredPoints( ).

FIG. 41 shows example code for creating two sorted tree structures to track lines removed.

FIG. 42 shows the example code for declaring the LastOffset class.

FIGS. 43A and 43B show the example code for performing the method findEdgeToErase( ).

FIG. 45 shows the example code for the main column processing loop.

FIG. 50 shows example code for the data members of the TPrimal object.

FIG. 51 shows example code for each element of the element matrix containing the total number of projector pixels.

FIG. 52 shows example code for the data members of the camera points.

FIGS. 53A and 53B show example code for iteration through every pixel of the TPrimal object in memory.

DESCRIPTION OF THE PREFERRED EMBODIMENTS

Figure 1:
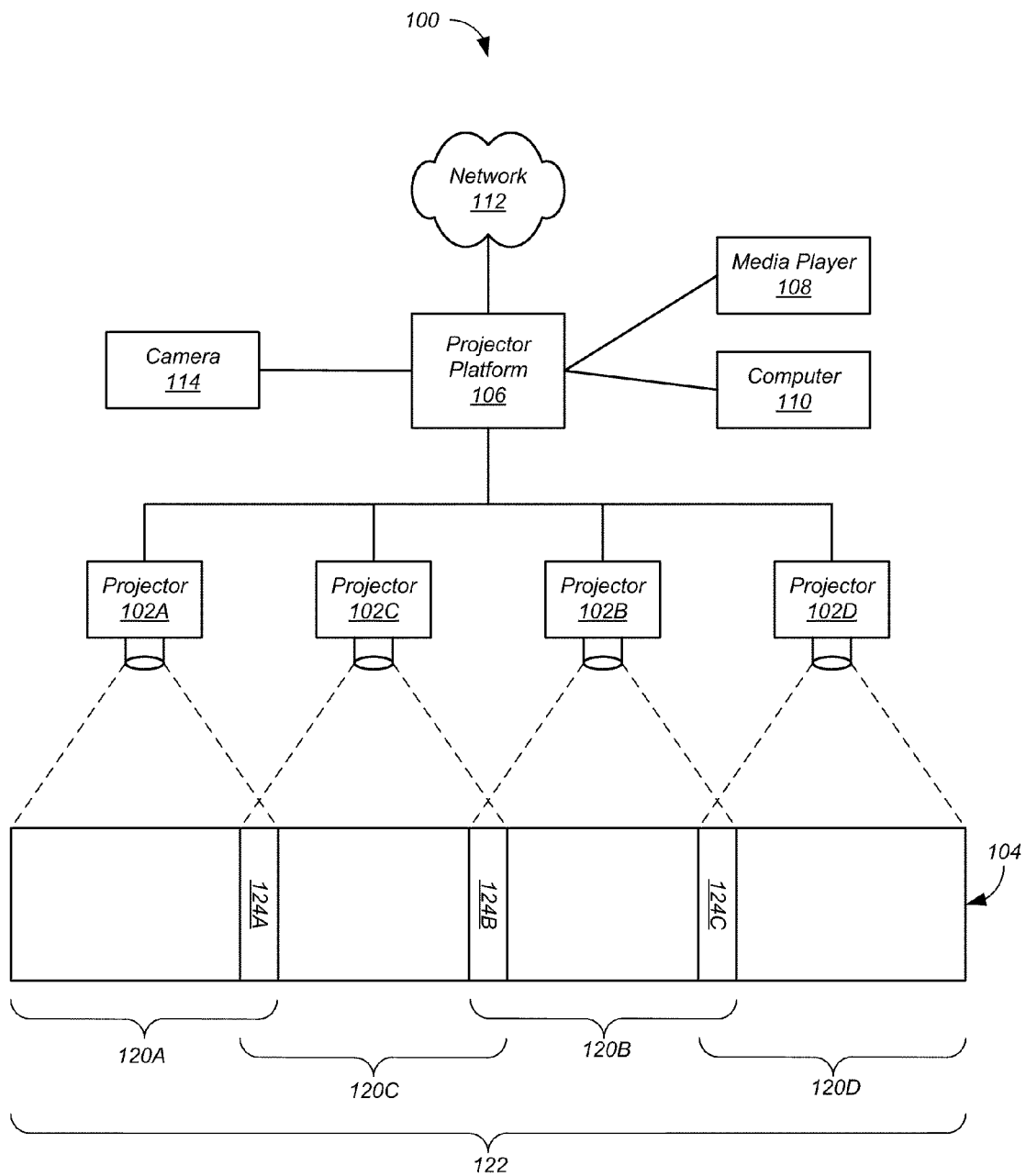
FIG. 1 shows a multi-projector display system according to an embodiment of the present invention.

The present invention relates to camera-based registration of projector display systems. During registration, one or more projectors project calibration images upon a display surface. A camera captures one or more images of each projected calibration image. A projector platform creates a mapping, for each projector, between pixel locations of the camera and pixel locations of the projector. After registration, the mappings are used to alter the images prior to projection so that seamless composite image can be displayed by the multiple projectors.

These mappings are stored in Virtual Pixel Map (VPM) files that form an accurate pixel registration map of each projector. Using the VPM files, each physical device pixel on a projector can be mapped to one or more logical pixels in a virtual region defining the large format display (composite image). This virtual large format display resolution defines the unit of each VPM pixel, which is a virtual pixel in the logical display region. It also defines the relative location of VPM pixels on one device relative to VPM pixels on another. The bounded display region represents a homogenous portion of the logical display region within which every pixel is addressable by at least one physical device pixel.

In order to project what appears to be a single continuous image, each individual projector's intrinsic and extrinsic parameters must all be in a common coordinate frame. This enables multiple projectors to generate a rectangular image of known aspect ratio. Projector platform 106, discussed below, performs registration of the projectors to create an accurate pixel registration map of each projector.

The registration process can use one or both of two techniques to create the mappings. According to the first technique, a coarse mapping is created for each projector using striped calibration images, which can be generated using Gray codes. This technique can establish a mapping to within approximately sixteen pixels. According to the second technique, raster calibration images are used. When both techniques are used, a precise mapping can be created between pixel locations of the camera and pixel locations of the projector. The mappings can be used for correcting projection distortions such as keystoning, aligning multiple projections, and the like. The present invention is concerned primarily with the first technique of using Gray codes. The second technique is discussed in commonly assigned U.S. patent application Ser. No. 12/549,011, filed Aug. 27, 2009, which is hereby incorporated by reference in its entirety.

The following discussion will be divided into four general areas:

A. Registration using Gray codes. This section will discuss the basic principals mapping striped calibration images generated using Gray codes. These basic principals are also discussed in U.S. patent application Ser. No. 12/549,011.

B. Interpolating Gray code values. As mentioned above, the first Gray code technique and second raster calibration technique can be combined to create a precise mapping between pixel locations of the camera and pixel locations of the projector(s). In this aspect of the invention the technique of using the raster calibration images is eliminated by interpolating the projector coordinate information decoded from the Gray code images. This saves processing time.

C. Removing shadow edges from Gray code images. While the techniques discussed in Sections A and B above work well for displaying video or still images, text requires even more precision. In this aspect of the invention, camera images are processed to reduce errors caused by noise so that text can be displayed without any noticeable misalignment between projectors.

D. Calibrating high-resolution multi-projector system with low resolution cameras. In this aspect of the invention, a scale factor is calculated based on the relative height/width of projector regions in the captured calibration images. Calibration images are recalculated using the scale factor to provide greater correspondence between the mapping of a low resolution camera to the high-resolution projectors.

In each of the embodiments A, B, C, and D, unless specified otherwise, the method or steps discussed are performed by the projector platform 106, which as discussed below, is implemented as a personal computer (PC) configured with a central processing unit (CPU) and graphic processing units (GPUs). One or more of the processing units or "processors" is used to execute the method or steps under control of software or firmware stored in memory in the PC or in an external memory such as computer-readable media.

A. Registration Using Gray Codes.

As mentioned above, the registration process can use one or both of two techniques to create the mappings. The following is a discussion of the first technique in which a coarse mapping is created for each projector using striped calibration images, which can be generated using Gray codes.

FIG. 1 shows a multi-projector display system 100 according to an embodiment of the present invention. System 100 includes four projectors 102A-102D aimed at a display surface 104. Of course, other numbers of projectors 102 can be employed. For example, two projectors 102 can be used. Data is provided to projectors 102 by a projector platform 106, which can obtain source input from a media player 108, a computer 110, a source connected by a network 112 such as the Internet, and the like. For calibration, system 100 includes a digital still camera 114.

In an embodiment, system 100 includes four projectors 102, and projector platform 106 is implemented as a personal computer (PC) configured with a central processing unit (CPU) and graphic processing units (GPU) providing four video outputs, each connected to one of projectors 102. An optional capture card provides video input from sources such as computer 110, media player 108, and the like. Digital still camera 114 is attached to the PC for the calibration process. In other embodiments, a video camera may be used for the calibration process. After calibration, digital still camera 114 may be removed or used as a media input device by projector platform 106.

Projectors 102A-102D produce respective component projections 120A-120D upon display surface 104. Together component projections 120A-120D form a single composite projection 122. Note that component projections 120 overlap in regions 124A-124C.

Figure 2:
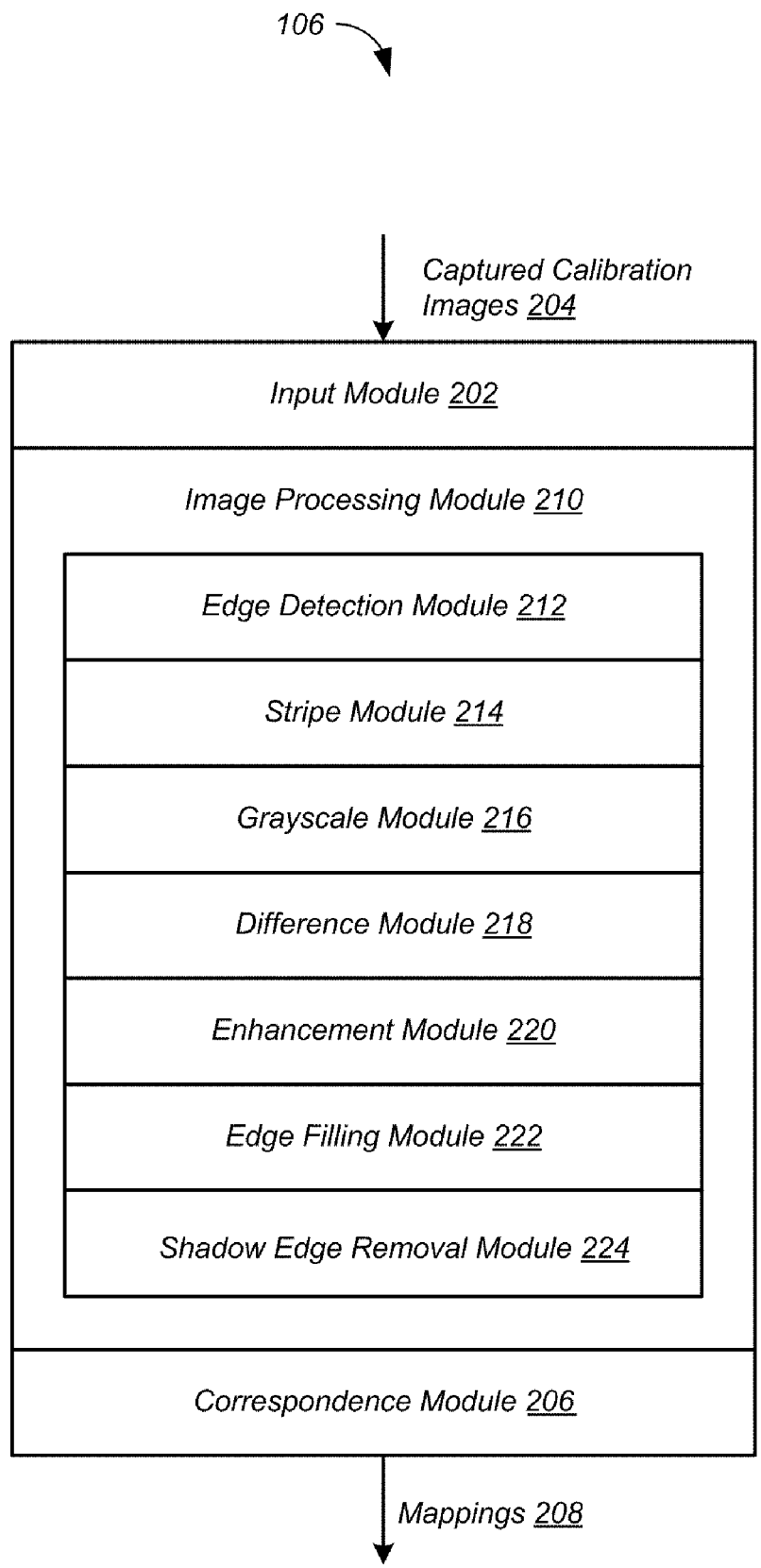
FIG. 2 shows elements of the projector platform of FIG. 1 for registering projectors according to an embodiment.

FIG. 2 shows elements of projector platform 106 of FIG. 1 for registering projectors 102 according to an embodiment. Although in the described embodiment, apparatus elements are presented in one arrangement, other embodiments may feature other arrangements, as will be apparent to one skilled in the relevant arts based on the disclosure and teachings provided herein. For example, the apparatus elements can be implemented in hardware, software, firmware, computer readable media having instructions executable on a computer, or combinations thereof.

Referring to FIG. 2, projector platform 106 includes an input module 202 that receives captured calibration images 204 from camera 114 and a correspondence module 206 that generates mappings 208 between pixel locations of camera 114 and pixel locations of projectors 102. Projector platform 106 also includes an image processing module 210 that includes an edge detection module 212, a stripe module 214, a Grayscale module 216, a difference module 218, an enhancement module 220, an edge filling module 222, and a shadow edge removal module.

Figure 3A:
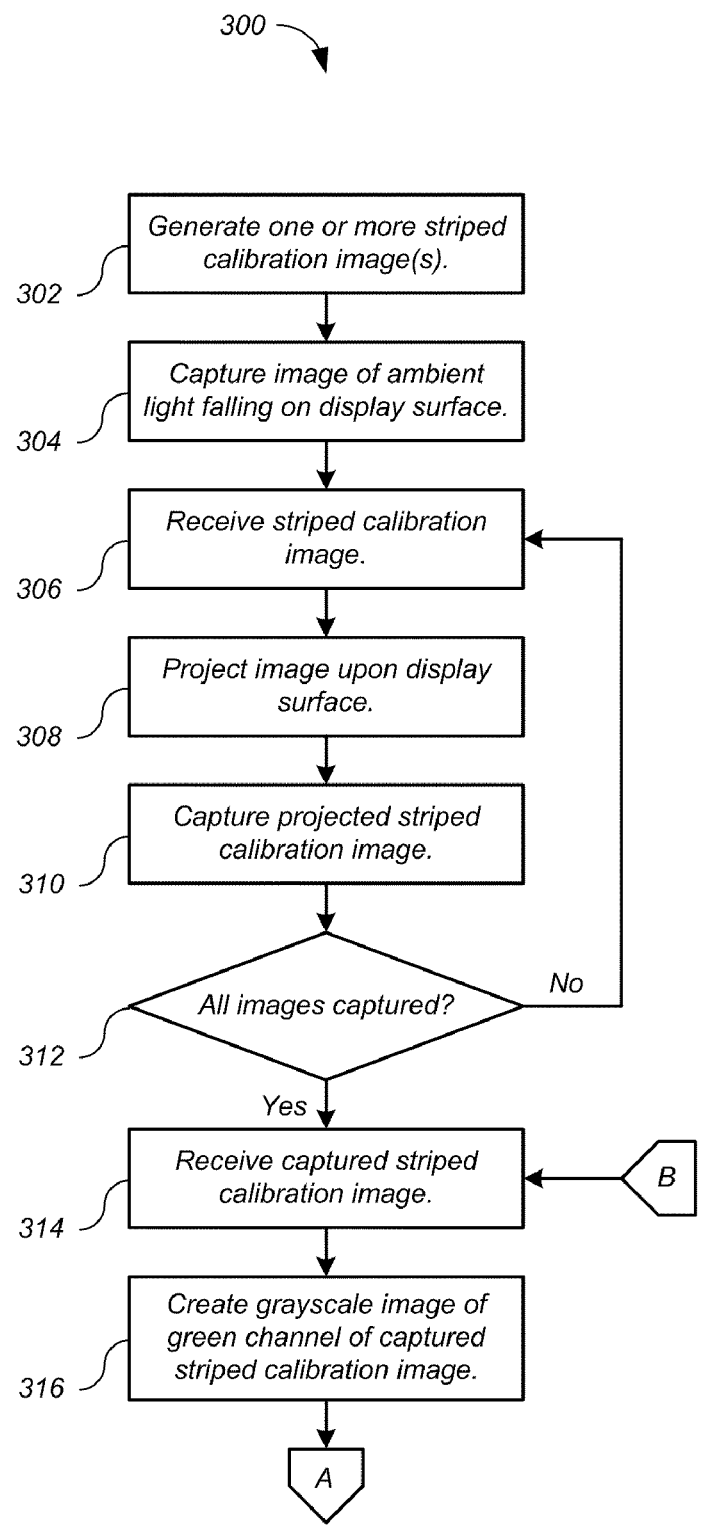
FIGS. 3A-3B show a process for the projector platform of FIG. 2 for registering a projector using striped calibration images according to an embodiment.
Figure 3B:
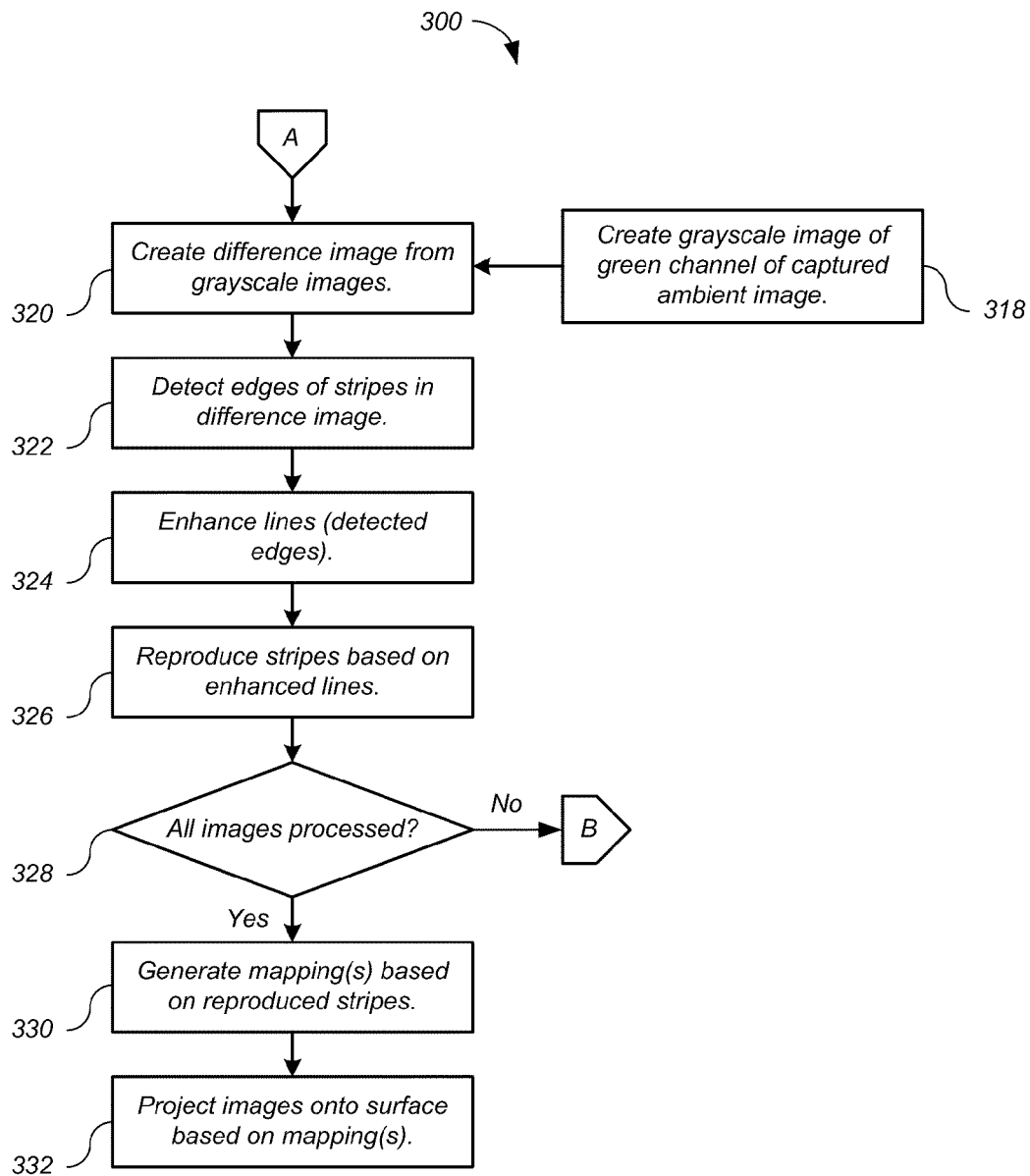
Figure 4:
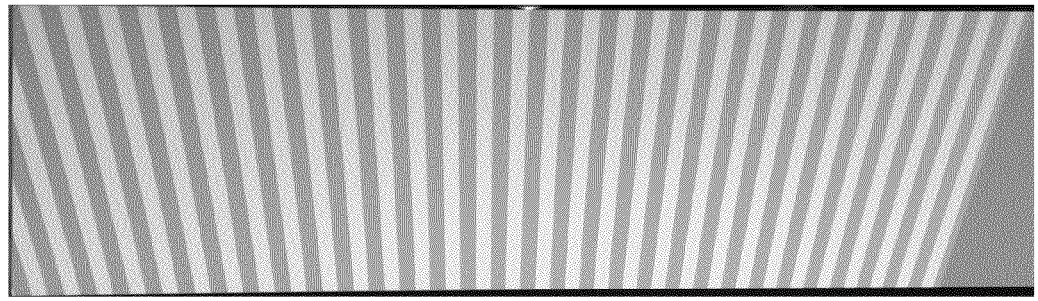
FIGS. 4-11 show an example sequence of eight captured Gray-code-encoded striped calibration images with the stripes oriented vertically.
Figure 5:
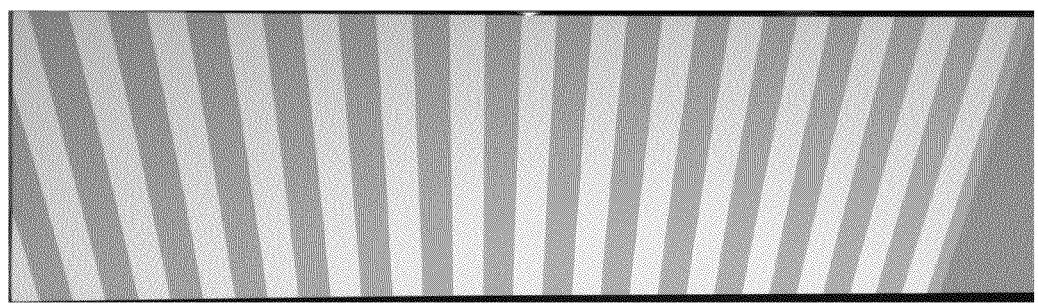
Figure 6:
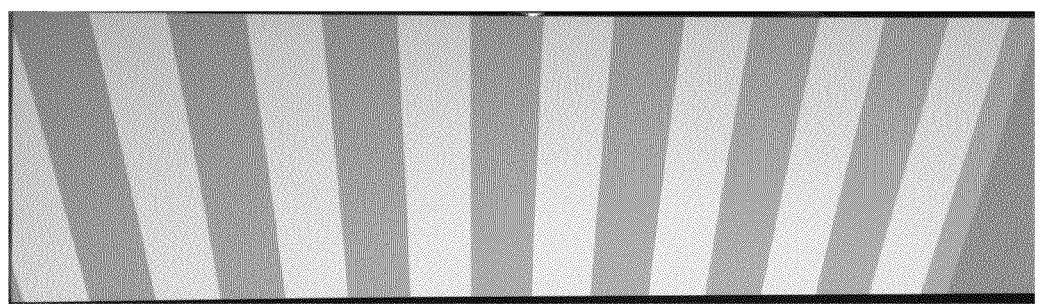
Figure 7:
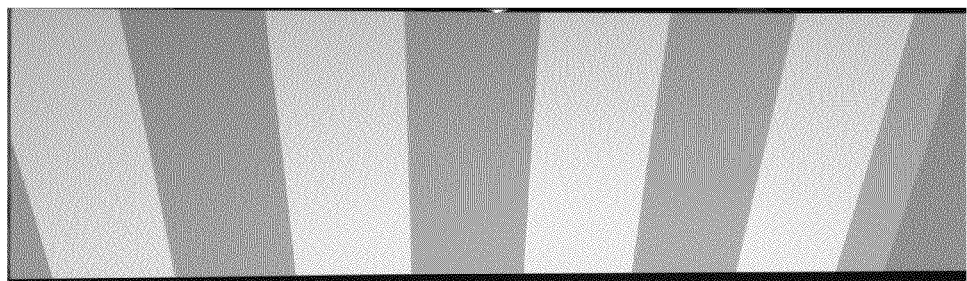
Figure 8:
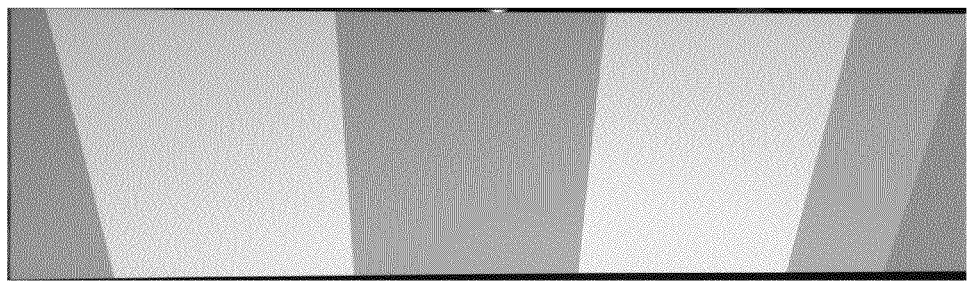
Figure 9:
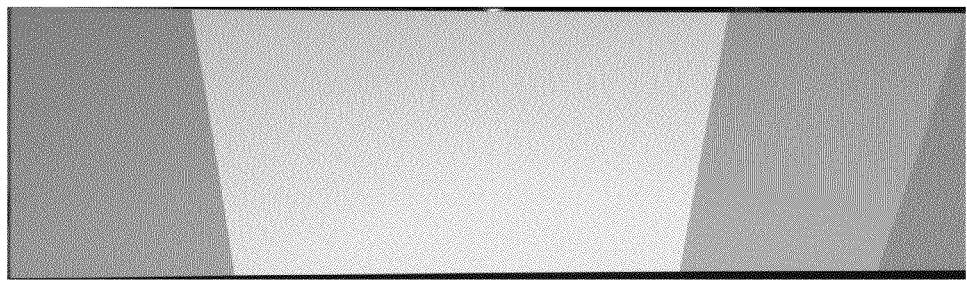
Figure 10:
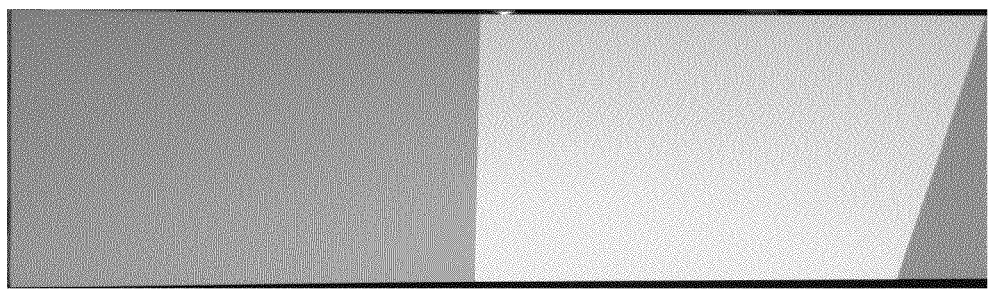
Figure 11:
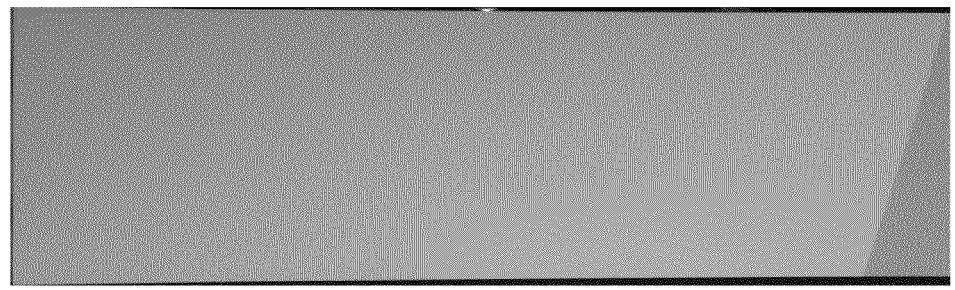

FIGS. 3A-3B show a process 300 for projector platform 106 of FIG. 2 for registering a projector 102 using striped calibration images according to an embodiment. Although in the described embodiment, the elements of the processes disclosed herein are presented in one arrangement, other embodiments may feature other arrangements, as will be apparent to one skilled in the relevant arts based on the disclosure and teachings provided herein. For example, in various embodiments, some or all of the steps of the disclosed processes can be executed in a different order, concurrently, and the like. Elements of process 300 can be repeated for each projector 102 in multi-projector system 100.

Referring to FIGS. 3A-3B, process 300 begins with generating one or more striped calibration images (step 302), each including a plurality of substantially parallel stripes. In this embodiment, the striped calibration images are generated using Gray code encoding. The striped calibration images can include a sequence of images with the stripes oriented vertically and a sequence of images with the stripes oriented horizontally. Then camera 114 captures an image of ambient light falling on display surface 104 (step 304). During the ambient capture, all light from projector 102 is blocked so only the ambient light falling on surface 104 is captured.

Next, one of the striped calibration images is received (step 306). Projector 102 projects the image upon display surface 104 (step 308). Projector 102 is described by a projector space comprising a plurality of pixel locations. For clarity, the pixel locations in the projector space are referred to herein as "projector pixel locations" or "projector pixels."

Camera 114 captures the projected striped calibration image (step 310). According to this embodiment, the striped calibration images are captured by camera 114 in RGB (red, green, blue) color space.

Steps 306-310 repeat until all of the projected striped calibration images have been captured (step 312). FIGS. 4-11 show an example sequence of eight captured Gray-code-encoded striped calibration images with the stripes oriented vertically. The captured striped calibration images 204 are stored with file names that allow images 204 to be identified for retrieval.

Next, projector platform 106 processes striped captured calibration images 204. Input module 202 receives one of striped captured calibration images 204 (step 314). Each captured calibration image 204 conforms to a virtual display space that includes a plurality of pixel locations. In some embodiments, the virtual display space is defined by the frame of camera 114. That is, virtual display space has the same resolution and dimensions as the frame of camera 114. Therefore, for clarity, the pixel locations in the virtual display space are referred to herein as "camera pixel locations" or "camera pixels." In other embodiments, other virtual display spaces can be used.

Figure 12:
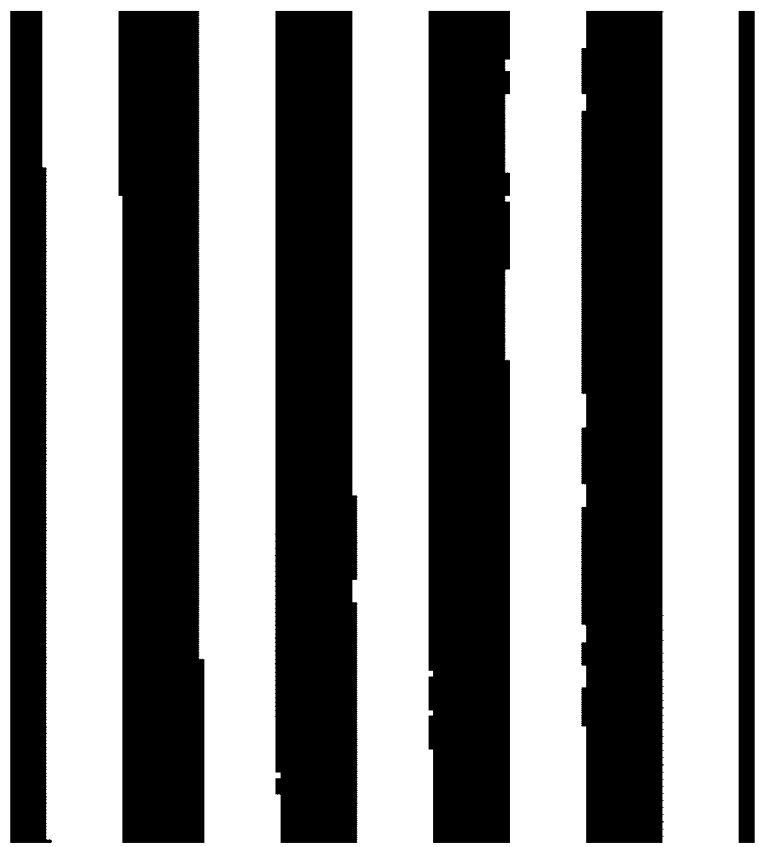
FIGS. 12 and 13 show difference images for striped calibration images.

In one embodiment, the Gray code images are processed by decomposing the image into blue and green color channels. The blue channel is then subtracted from the green channel, creating a Gray scale image with white representing the green regions and black representing the blue regions, as shown in FIG. 12. One problem with this approach is that the green and blue channels as captured by camera 114 are not pure, so that the separation between the color channels leaves artifacts when the images are subtracted. These artifacts have a negative impact on registration accuracy, especially near the green/blue edges as can be seen in FIG. 12. To address this problem, improved embodiments were developed, as described below.

Figure 13:
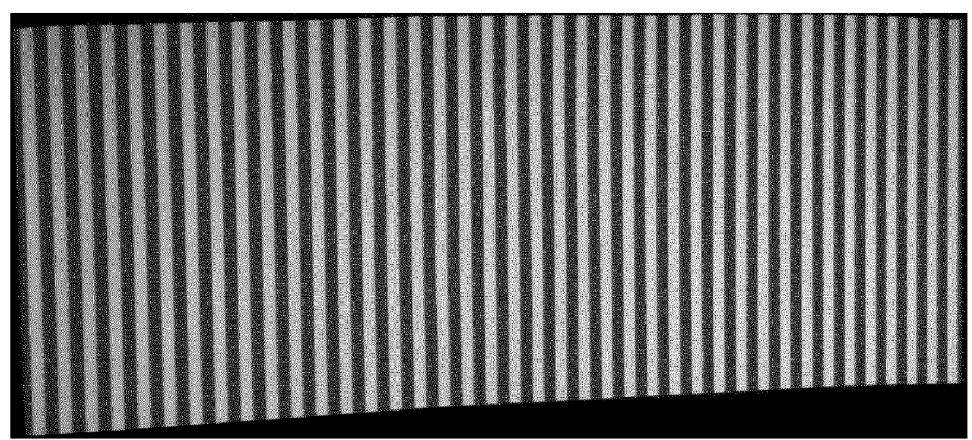

Our experience has shown that the red channel of the RGB format is the most noisy, followed by the blue channel, then the green channel. Therefore processing of each captured striped calibration image 204 begins with the green channel. Of course, other color channels can be used instead. Grayscale module 216 selects the green channel from captured striped calibration image 204, thereby creating a "green" Grayscale image (step 316). Grayscale module 216 also selects the green channel from the captured image of ambient light, thereby creating an "ambient" Grayscale image (step 318). Difference module 218 then subtracts the ambient Grayscale image from the green Grayscale image, thereby creating a difference image (step 320). A light thresholding is applied to the difference image to remove any pixels with a value <5, for example. An example of the resulting difference image is shown in FIG. 13.

Based on the file naming scheme, image processing module 210 can determine the orientation of the stripes in the difference image. The processing of a difference image having vertical stripes will be described. Difference images having horizontal stripes are processed in a similar manner.

Figure 14:
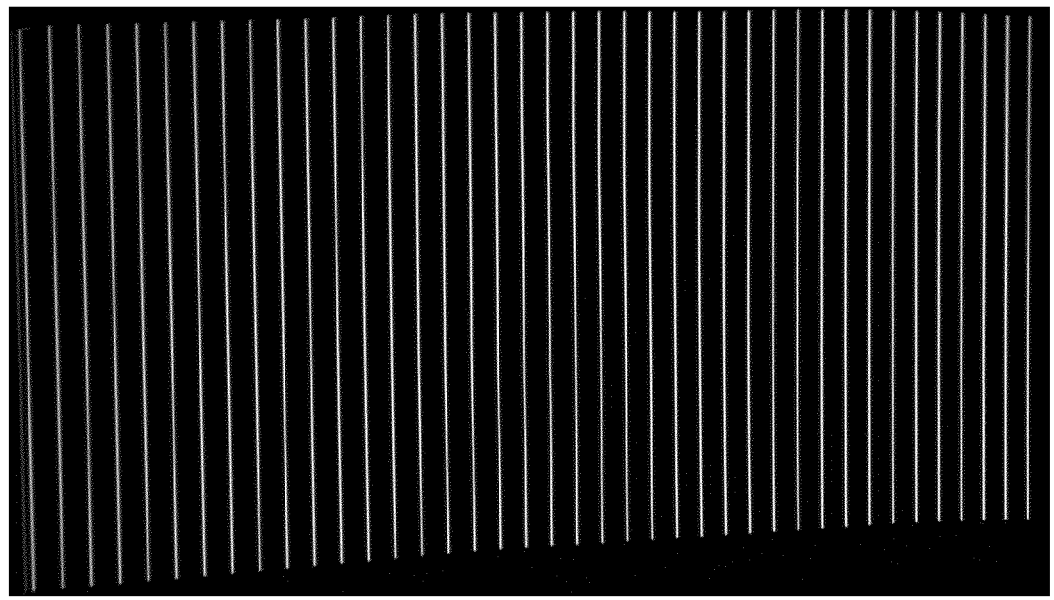
FIG. 14 shows an image containing lines representing the left edges of the stripes in the difference image of FIG. 13.
Figure 15:
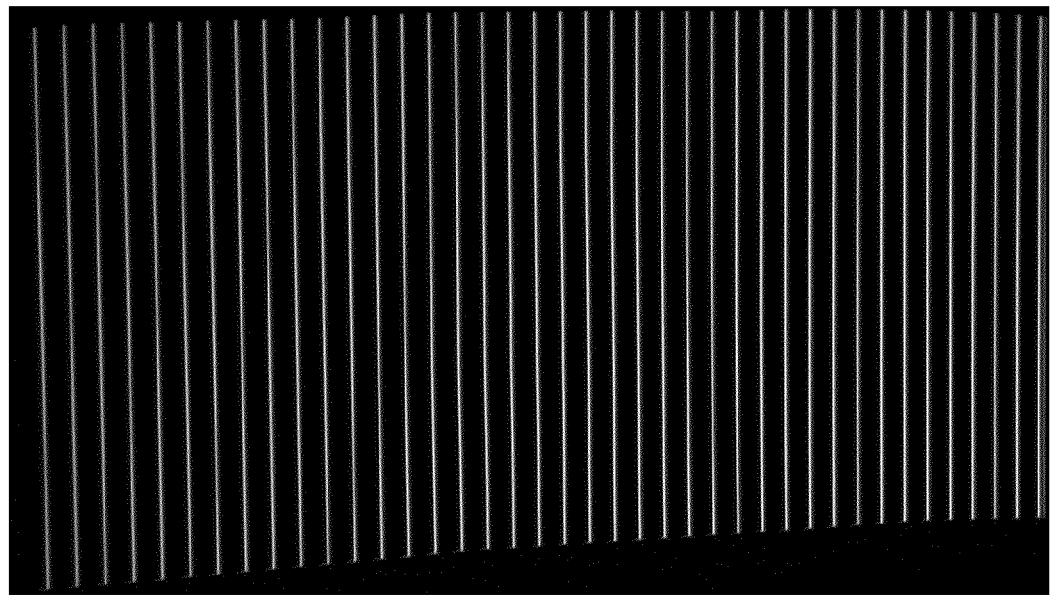
FIG. 15 shows an image containing lines representing the right edges of the stripes in the difference image of FIG. 13.

Edge detection module 212 of projector platform 106 detects edges of the stripes in the difference image (step 322). In processing vertical stripes, edge detection module 212 applies an edge detect filter to select the left edges of the stripes using the gradient moving from dark to light when moving from left to right across the difference image. The resulting image contains lines representing the left edges of the stripes in the difference image of FIG. 13, as shown in FIG. 14. Similar processing is applied to detect the right edges of the stripes in the difference image of FIG. 13, as shown in FIG. 15.

Figure 16:
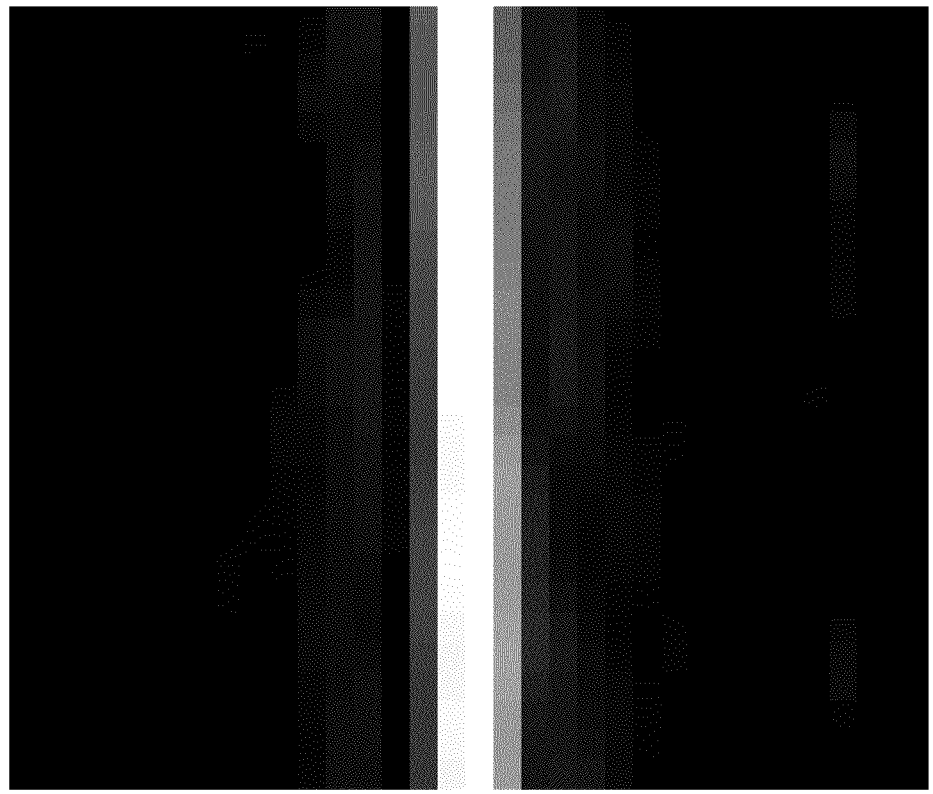
FIG. 16 shows a line representing an edge before line enhancement.
Figure 17:
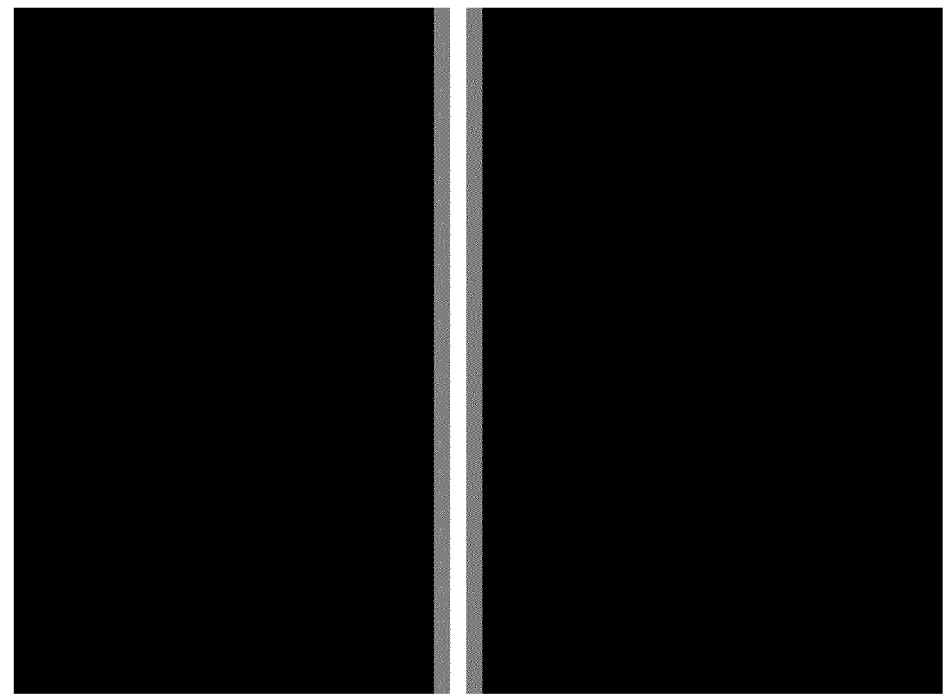
FIG. 17 shows the result of line enhancement for the line of FIG. 16.

The lines created during the edge detection span multiple pixels and include noise, as shown in FIG. 16. Therefore, enhancement module 220 enhances the lines (step 324). In particular, enhancement module 220 processes the images containing the left and right edges to obtain lines that are only a single pixel wide. FIG. 17 shows the result of line enhancement for the line of FIG. 16. The Gray bands on each side of the line in FIG. 17 can be added by enhancement module 220, but are not needed.

Figure 19:
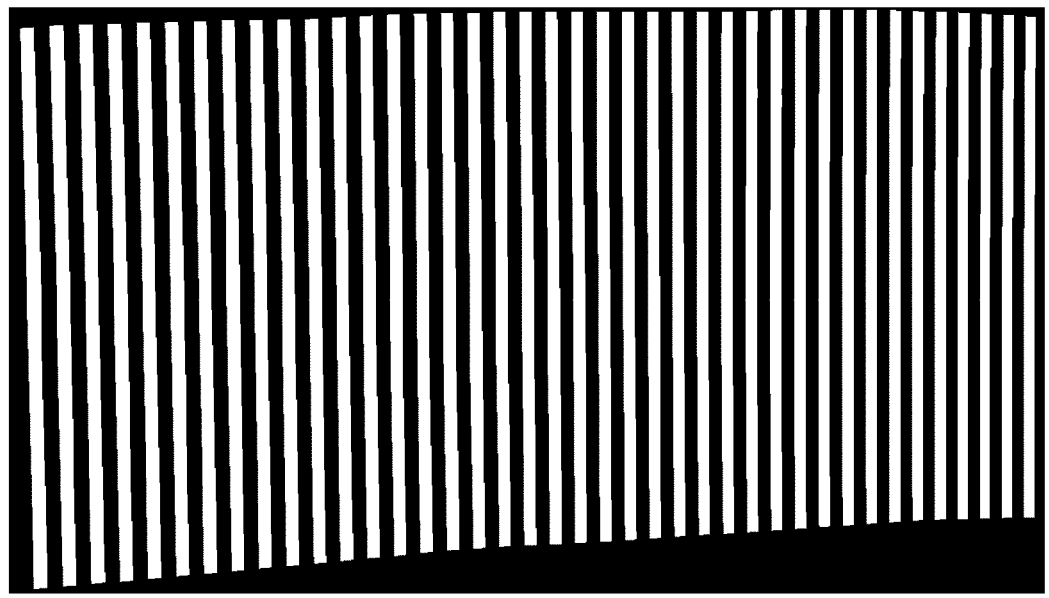
FIG. 19 shows an example enhanced captured calibration image, masked with a projector region mask.
Figure 20:
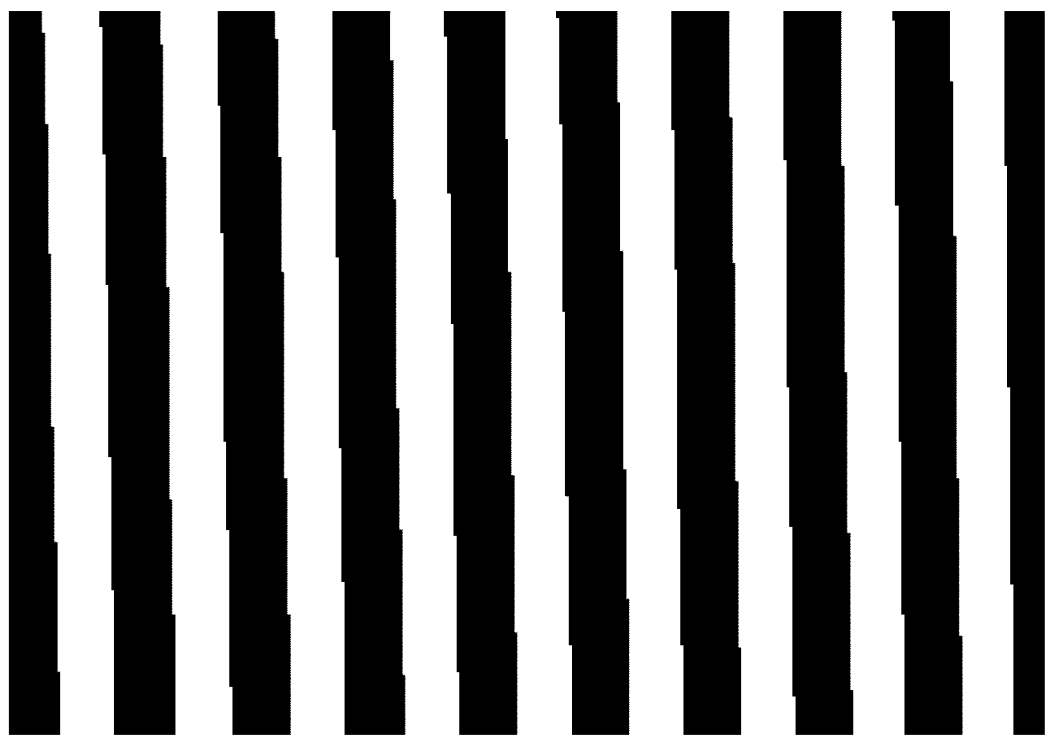
FIG. 20 is a close-up view of FIG. 19.

After line enhancement, stripe module 214 reproduces the stripes based on the enhanced lines (step 326). That is, stripe module 214 reproduces each stripe based on the enhanced lines representing the left and right edges of the stripe. This reproduction is accomplished in two passes, working with the two line-enhanced images representing the left and right stripe edges, and producing one enhanced captured calibration image. Example code for implementing the reproduction is shown in FIGS. 18A-B. FIG. 19 shows an example enhanced captured calibration image, masked with a projector region mask that defines the region in the virtual display space occupied by the projection on display surface 104 of projector 102. FIG. 20 is a close-up view of FIG. 19, and can be compared to FIG. 12 to illustrate the removal of undesirable artifacts by the processing described above.

In some of the captured striped calibration images, the green regions are flush with the left or right edges of the projector region mask. Because of noise and slight variations in light patterns, the edge detection for these images may not precisely follow the edge of the projector region mask. If there are any gaps between the edge of the green region and the mask, pixels in the gaps will have invalid mapping coordinates, causing stray pixels to appear in the body of the projector image. An edge filling process can be used to address this case. An example edge filling process is now described for edge filling module 222 of projector platform 106.

First, the distance between the edge of the enhanced captured calibration image and the edge of the projector region mask is measured. Next the distance from the edge of the image to the edge of the first filled stripe in the enhanced captured calibration image is measured. Next the difference in the distances is calculated, taking into account any pixels that may wrap around the corners creating large distances. Next, the average distance is calculated. For example, the average distance can be calculated as the sum of the differences divided by the count of lines with a difference greater than zero. If this average distance is less than 3.0, for example, the edge is flush and should be filled. The filling step fills white pixels between the edge of the stripe to the edge of projector region mask. After edge filling is completed, the image is saved to be used for creating the camera to projector coordinate mapping 208.

When all of the captured striped calibration images have been processed (step 328), a coordinate mapping 208 can be generated. Correspondence module 206 generates the coordinate mapping 208 by determining the correspondence between each projector pixel and one or more camera pixels based upon the stripes in the enhanced captured striped calibration images (step 330). Mapping 208 can be generated according to conventional techniques. Mapping 208 can be stored in two matrices, one for each coordinate axis, that conform to the virtual display space. Mapping 208 is resolved to approximately sixteen pixels.

Once mapping 208 is generated for a projector 102, that mapping 208 and projector 102 can be used to project images such as still images and video frames that conform to the virtual display space. Of course, any image can be used after mapping that image into the virtual display space. Projector 102 projects these images onto surface 104 based on the correspondence (step 332) contained in mapping 208. The above described registration process is performed for each of projectors 102A-D in the exemplary multi-projector system shown in FIG. 1.

B. Interpolating Gray Code Values

As mentioned above, an embodiment of our system uses Gray code encoded images and single line raster images to accurately determine the projector to camera coordinate mapping. The Gray code images are encoded with the projector's x and y coordinates. During the analysis phase the projector's x and y coordinates are decoded from the captured Gray scale image. The location of the projector's coordinates within the captured calibration image creates the mapping relationship between the projector coordinate and the camera coordinate. This approach works well but the process for projecting and capturing the calibration images is time consuming as there are 8 Gray code images and 16 raster images in both the x and y directions for a total of 48 calibration images. What is needed is a way to eliminate the number of calibration images and reduce the calibration time. In this aspect of the present invention, the 32 (16x+16y) raster calibration images are eliminated by interpolating the projector coordinate information decoded from the Gray code images.

As discussed above, the initial steps in the calibration process include projecting a number of Gray code encoded images for both the X and Y dimensions (FIG. 3A, step 308). The camera captures each image (FIG. 3A, step 310) and through file naming with knowledge of the sequence of images projector platform 106 saves the images with names such as "Gray_code_X_00.jpg". This naming is used during the analysis phase to know which order to read and decode the data into a binary format. FIGS. 4-11 show the sequence of eight images projected to calculate positions in the X dimension, e.g. stripes oriented vertically. A similar sequence of images is projected and captured for the Y dimension.

After the Gray code images are captured, they are processed by projector platform 106 as discussed above. The captured Gray code images can be enhanced to improve the accuracy or the coordinate mapping as detailed in Section A above. A projector's x and y values are determined for each camera coordinate. The projector's coordinate is encoded in the Gray code image with the light regions representing a 1 bit and dark regions representing a 0 bit. Thus, at this stage, the process is the same as discussed above up to step 328 in FIG. 3B.

Figure 21:
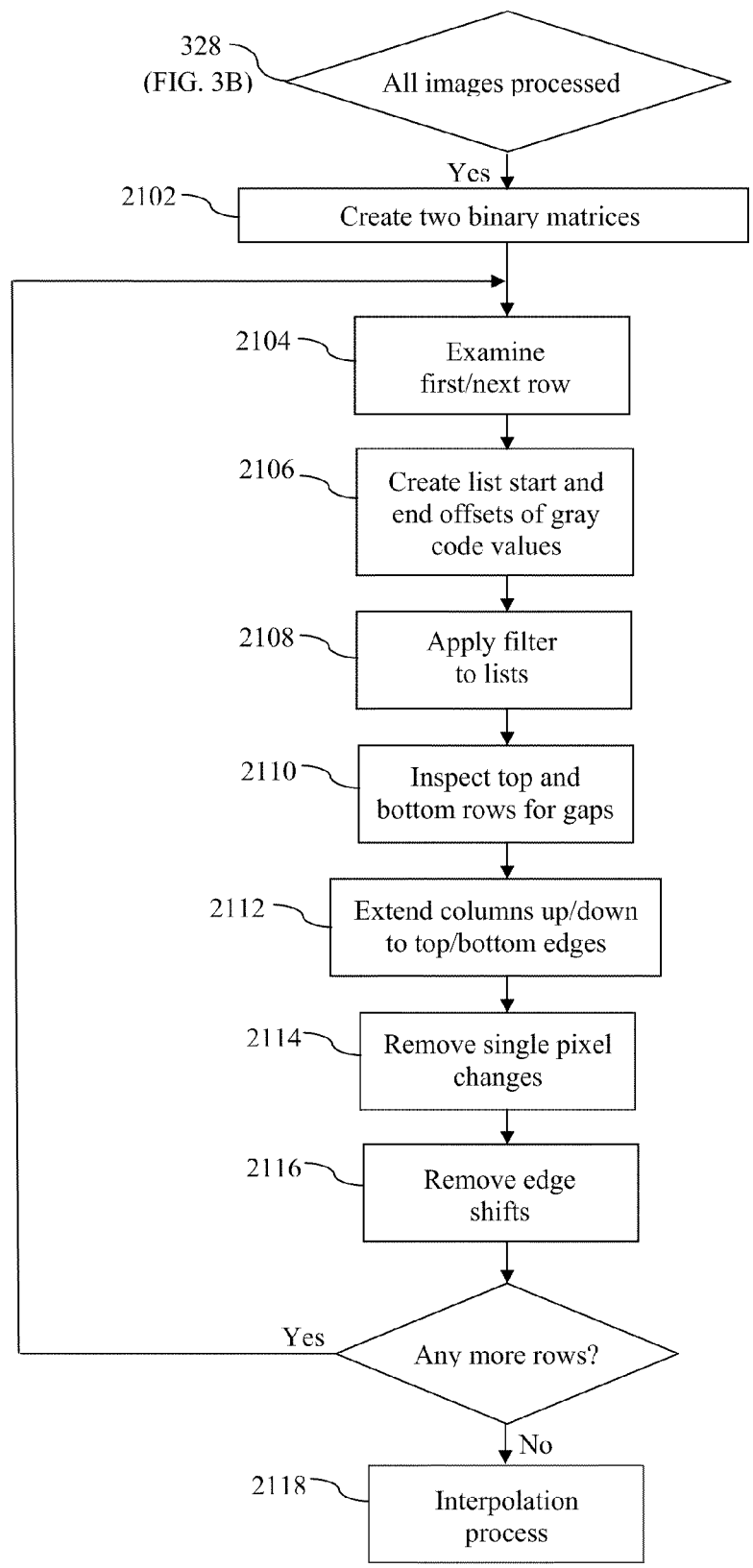
FIG. 21 shows a process for the projector platform of FIG. 2 for modifying the two binary matrices before interpolating the values in the Gray code bands according to an embodiment of the present invention.

The process flow for this presently discussed embodiment is shown in FIG. 21.

After all the images are processed (step 328 in FIG. 3B returns yes), in this embodiment of the present invention, the projector platform 106 creates two binary matrices the same size as the captured camera image for the x and y coordinates (FIG. 21, step 2102). The projector coordinate ($x_p, y_p$) mapped to a camera coordinate ($x_c, y_c$) is determined by reading the value at ($x_c, y_c$) in the binary matrix x for $x_p$ and reading the value at ($x_c, y_c$) in the binary matrix y for $y_p$.

Figure 22:
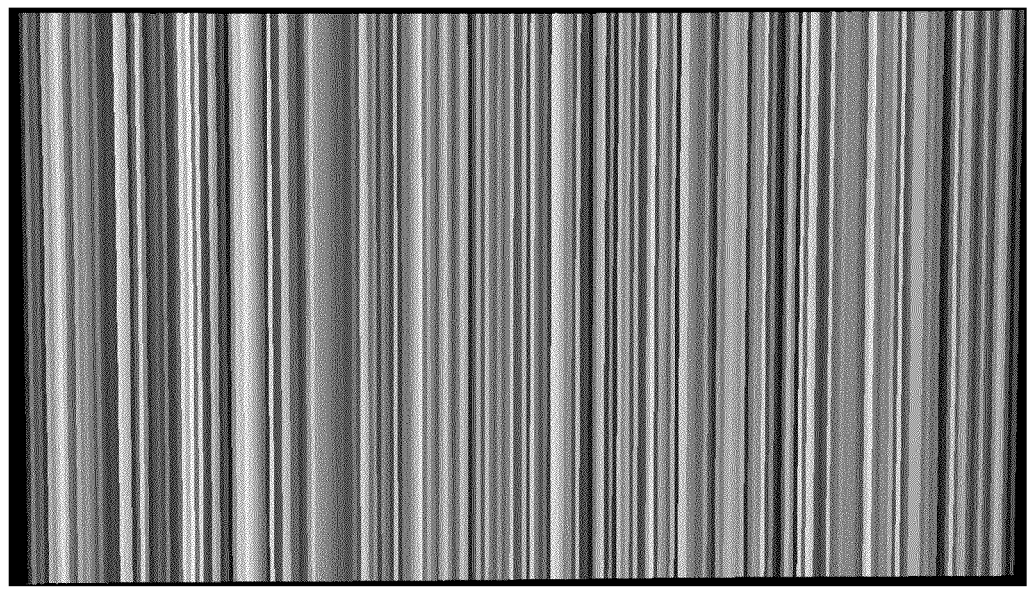
FIG. 22 illustrates a shade coded binary file x.
Figure 23:
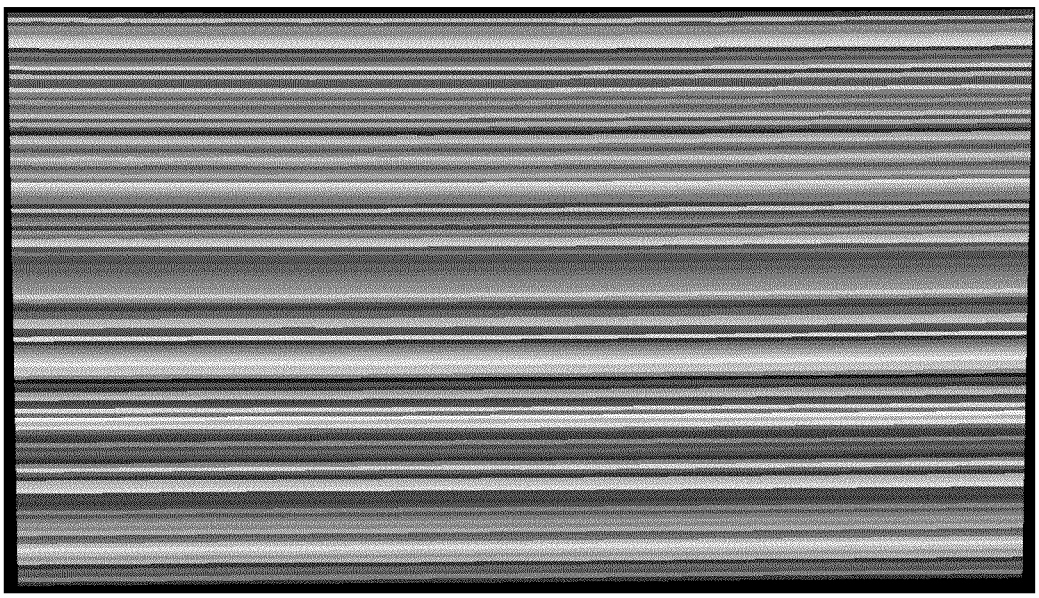
FIG. 23 illustrates a shade coded binary file y.

FIGS. 22 and 23 show the binary files x and y, respectively, with each projector coordinate value mapped to a unique shade for illustrative purposes only.

The Gray code bands encode the projector coordinate information divided by a multiple of usually eight. A closer inspection of the images in FIGS. 22 and 23 show that each Gray code value band covers many pixels. As discussed in Section A above, raster images can be utilized with the Gray code images. The raster images are used in the calibration process to fill in the missing values within each Gray code band to provide greater accuracy in the projector coordinate to camera coordinate mapping. This embodiment of the present invention, involves a method for interpolating the values in the Gray code band without the need for the 16 raster images for the x dimension and the 16 raster images for the y dimension.

The process for processing the x values will now be described in detail, starting at step 2104 in FIG. 21. A similar process is followed for processing the y values, but for the sake of clarity will not be described in detail herein. It will be appreciated that for processing the y values, columns are examined instead of rows in the detailed explanation that follows.

Each row of the binary x matrix is processed, starting with a first row (step 2104). The process will loop back to this step to process the next row until there are no more rows to examine. For each row a list of GrayCodeValueRange objects is created showing the start and end offsets of the Gray code value (step 2106). The GrayCodeValueRange class is defined by the example code shown in FIG. 24

After this process of identifying the Gray code value ranges for each row, there is then a master list with an entry for each row in the binary x matrix. Each entry in the master list contains a list of GrayCodeValueRange objects for the Gray scale values found in the corresponding row. For example, starting at the bottom, left of FIG. 22, the present invention looks at the Gray code value of the first (leftmost) pixel in the first row. It may have a value of G4, for example, the start offset of which would be zero. If that value extends for 3 additional pixels (creating a vertical band), the end offset for value G4 would be 3. This process continues until the end of the first row and results in a list of Gray code values in that row with each having a start and end offset. Then the next row is processed in the same manner.

Next a filtering process (step 2108) is applied to the master list of lists, because there are cases, usually along the edges, where the detected Gray code values may need adjustment. The present invention calculates the distances from the left and right edges to the first non-zero pixel in the projector mask. The end result is two arrays, one for the left and one for the right, with a length equal to the height of the binary x matrix. Each entry in the arrays contains the distance from the edge to the first non-zero projector mask pixel.

Figure 25:
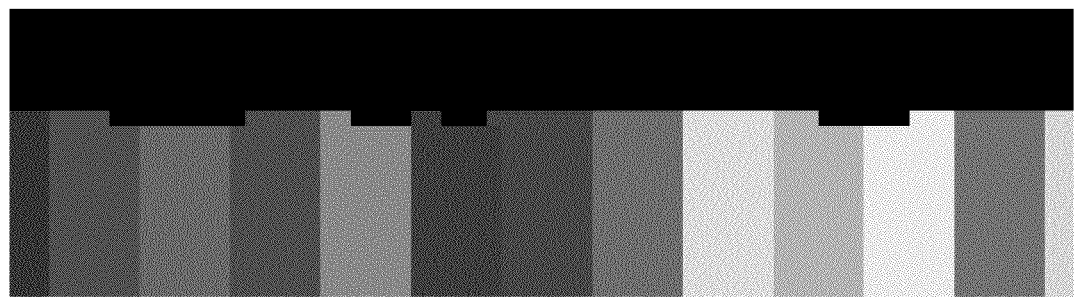
FIG. 25 illustrates gaps along the top edge of the binary x matrix.

The list of GrayCodeValueRange is examined for each row. If the list of GrayCodeValueRange objects is of length zero, a zero GrayCodeValueRange object is created as a placeholder. If there are entries in the GrayCodeValueRange list, the list is inspected for valid and ascending Gray code values. Next another Gray code order list is created with each entry corresponding to each Gray code value found in the binary x matrix. Each entry of the list contains the list of GrayCodeValueRange objects in ascending row order with the Gray code value. This list is used to inspect the top and bottom rows to create continuous values across the initial and bottom rows (step 2110). There are cases where the mask may be irregular causing gaps along the edges. When such gaps are found the present invention looks at the trend for the column widths and offsets for the initial or bottom rows and extends the columns up or down to the top or bottom edges to create a consistent list of Gray code values (step 2112). FIG. 25 shows an example of some of the gaps found on the top edge of a binary x matrix.

The Gray code order list is also used to remove single pixel changes within the column start and end offset values (step 2114). These shifts are usually caused by low quality cameras where the line enhancement module had difficulty processing the line data. Another filtering step is done to remove edge shifts that run for only a few pixels in length (step 2116).

Next the interpolation process starts. This is shown generally as step 2118 in FIG. 21 but is shown in detail in FIGS.

26A and 26B. Because the VPM (virtual pixel map) is a mapping of projector coordinates to one or more camera coordinates, the present invention must ensure that each projector coordinate maps to at least one camera coordinate. A matrix of LayeredPixel objects is allocated for the x values with the width and height equal to the camera image dimensions. The LayeredPixel class is defined by the example code shown in FIG. 27.

The interpolation process proceeds by iterating row by row through the master list containing a list of GrayCodeValueRange objects for each row. The first GrayCodeValueRange object in the row is processed in a right to left direction. All other GrayCodeValueRange objects in the row are processed in a left to right direction using the method interpolateMultiValuesX( ). The method is outlined in the example code shown in FIG. 28 and FIG. 29.

The method determines the start and end Gray code values and the start and end offsets of the camera coordinates for the given GrayCodeValueRangeObject (step 2602). The method, which is outlined in the example code shown in FIG. 30, next creates an array of the Gray code values to span the start and end camera coordinate range (step 2604) and calls the method createLayeredPixelsX( )(FIG. 27).

The present invention iterates through the cameraColumnValues array and compares the current offset value to the previous value (step 2606). If they are unequal the method checks the length of the run. If the length of the run is one, there is only one Gray code value mapped to the camera coordinate value. If the length of the run is greater than one, there are multiple Gray code values mapped to a single camera coordinate value. If the mapping is one to one a LayedPixel object is allocated with the single Gray code value (step 2610). If the mapping is many to one, a LayeredPixel object is allocated with a list of all the Gray code values mapped to the camera coordinate value (step 2608). The LayeredPixel object is then placed in the LayeredPixel object array at the location of the current camera coordinate's row and column, thus filling the layered pixel object matrix (step 2612).

Once the LayeredPixel object matrix is filled with LayeredPixel objects, the matrix is inverted to create two matrices, x and y, in the size of the projector dimensions (step 2614). The example code shown in FIG. 31 illustrates the loop that processes the LayeredPixel object matrix to create two projector matrices that contain the respective x and y coordinates of the camera coordinate to which the projector coordinate is mapped.

Figure 26A:
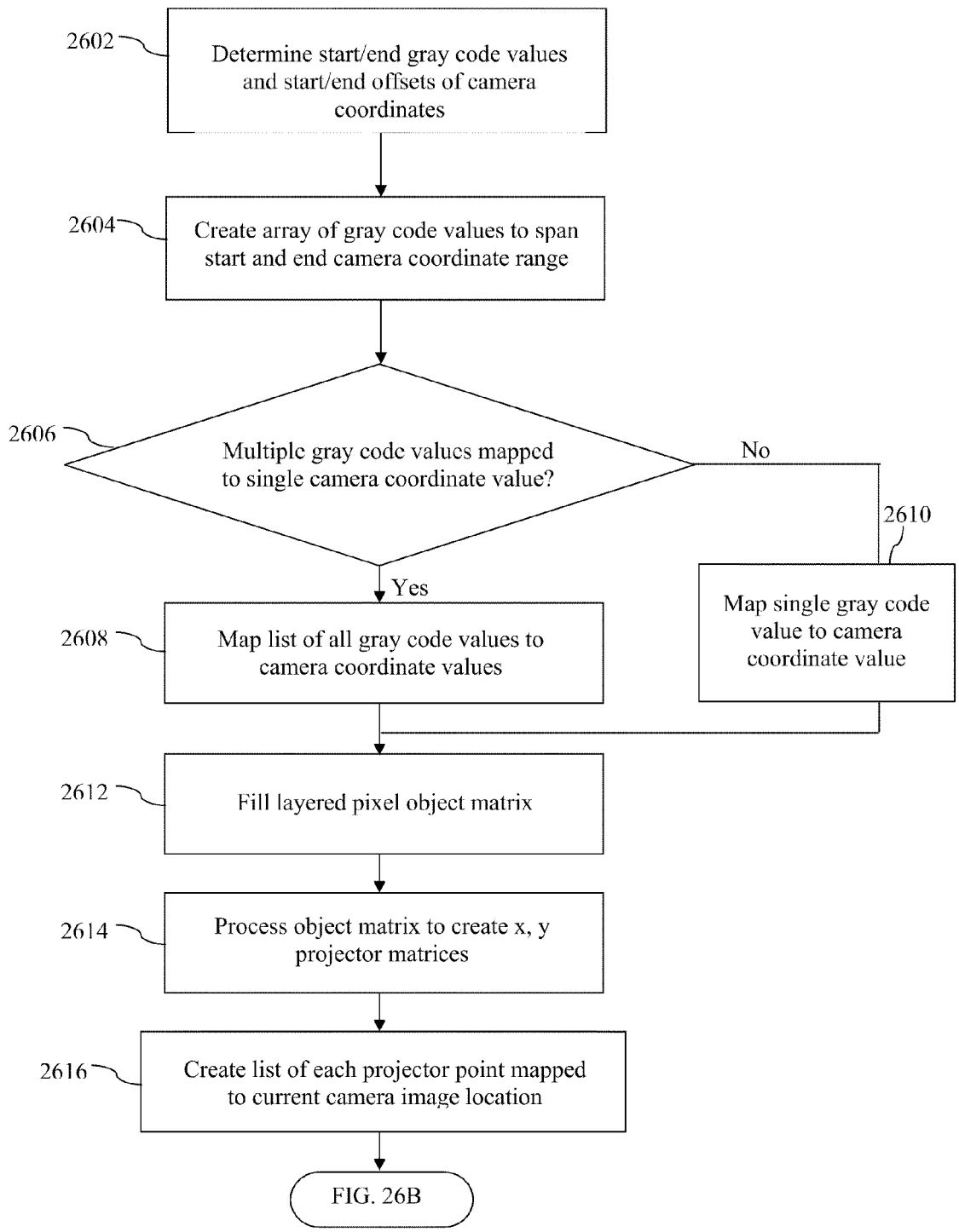
FIGS. 26A ad 26B show a process for the projector platform of FIG. 2 for interpolating the values in the Gray code bands according to an embodiment of the present invention.
Figure 26B:
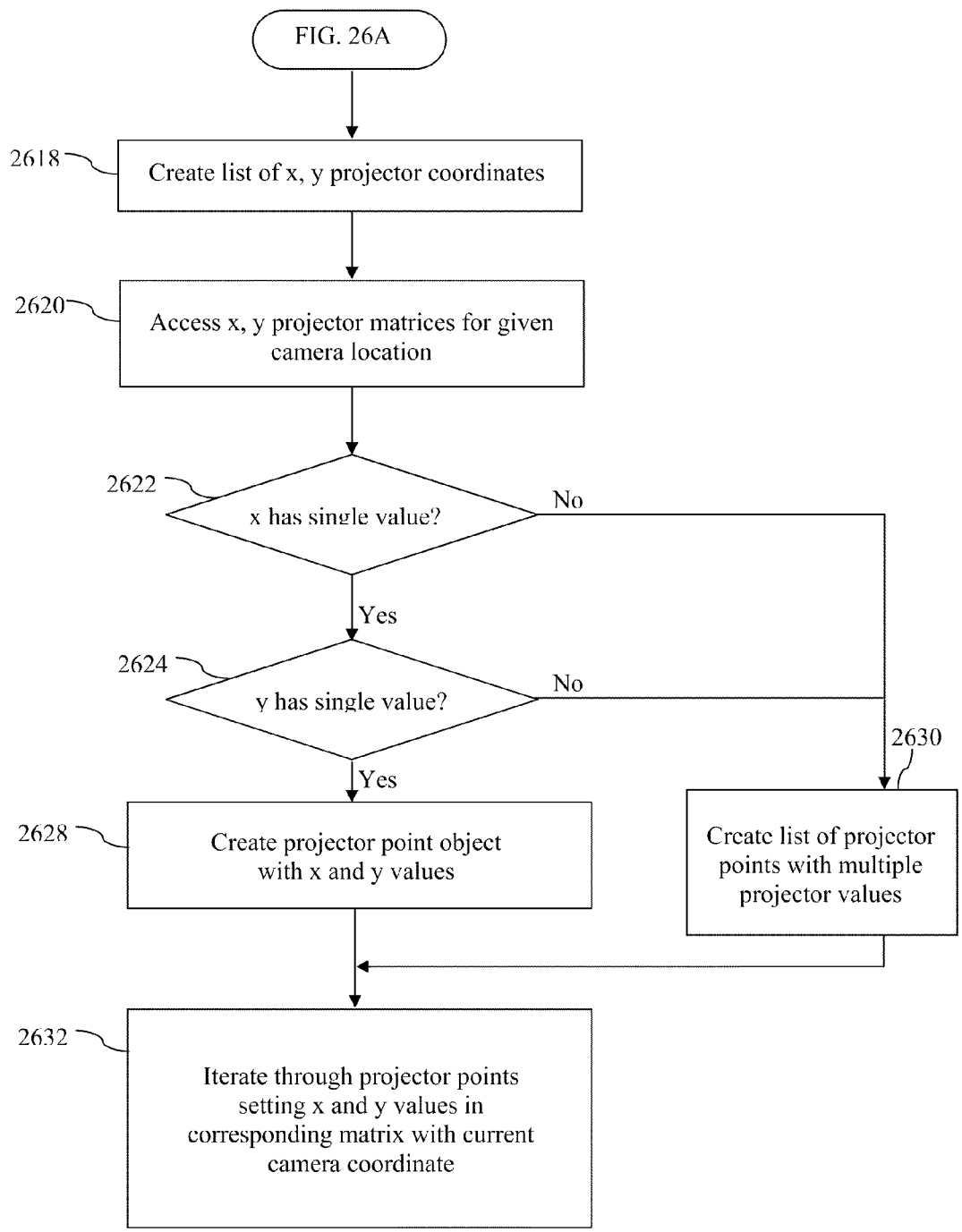

The loop iterates through the camera width and height accessing each element of the LayeredPixel object matrices for the x and y coordinates. For each element of the matrices, the loop creates a list of each projector point mapped to the current camera image location (step 2616). The method getLayeredPoints( ) shown in FIG. 32 merges the information from the LayeredPixel object matrices to create a list of (x,y) projector coordinates (FIG. 26B, step 2618).

The method accesses the LayeredPixel objects from the x and y matricies for the given camera location (step 2620). If both LayeredPixel objects have a single projector value (steps 2622 and 2624 answer Yes), a projector point object is created with the x and y values from the corresponding LayeredPixel objects (step 2628). If one of the LayeredPixel objects has a single projector value and the other has multiple projector values (steps 2622 or 2624 answers No), a list of projector points is created iterating through the multiple projector values using the single projector value (step 2630). Finally if both LayeredPixel objects contain multiple projector values (steps 2622 and 2624 both answer No), a list of projector points of all possible combinations of the multiple projector values is created (also shown for simplicity as step 2630).

Once the list of projector points from the getLayeredPoints( ) is returned, the loop iterates through the list of projector points setting the x and y values in the corresponding matrix with the current camera coordinate. When the loop is completed there are two matrices, x and y, in the size of the projector dimensions that contain the respective camera coordinate (step 2632).

The final step is to create a Virtual Pixel Map (VPM) using the two matrices. The system iterates through each projector coordinate, accessing the x camera coordinate value from the x matrix and the y camera coordinate value from the y matrix. The (x,y) camera coordinate is then mapped to the current projector coordinate in the VPM.

C. Removing Shadow Edges from Gray Code Images

While the techniques discussed in Sections A and B above work well for displaying video or still images, text requires even more precision. In this aspect of the invention, camera images are processed to reduce errors caused by noise so that text can be displayed without any noticeable misalignment between projectors.

In an embodiment of the present invention, a Windows desktop manager has been developed that allows the VPM to be applied to the Windows desktop to create a large seamless display across two projectors. When working with the desktop the most commonly displayed item is text which requires much finer alignment between the two projectors than video or still images. Using a homography calibration approach, the accuracy of the pixel positions within the overlapped projector region can be difficult as homography is a linear system that tries to find the best fit within a set of noisy points mapping the projector to camera coordinates. The noise can come from imperfections in the camera lens especially when using a low cost web camera. The end result is that text displayed on the Windows desktop that is positioned in the projector overlap region can look blurry when the calibration accuracy is a few pixels in error. One approach to address these imperfections would be to calibrate the camera to compensate for its imperfections but that would require an additional burdensome step.

Due to these limitations of homography the present invention uses a modified Gray code approach, as discussed above in Section B to better address the imperfections of the system such as a camera. With the Gray code approach the system is not constrained in a linear manner and can adjust to curves found in the poor lens quality. While the output of the VPM may include such curves, they are generally not noticeable to the user. The challenge faced by a Gray code approach is the image data to process is more complex than just simple lines and can be difficult to decipher when the images are captured with a low quality web camera.

Sections A and B above describe methods for enhancing Gray code images to improve the accuracy of the VPM coordinate mapping and create a very precise mapping of the data encoded in the camera images captured. While this method works well with good quality DSLR cameras, a number of modifications were needed to process the gray code images captured with a low cost web camera.

Figure 33:
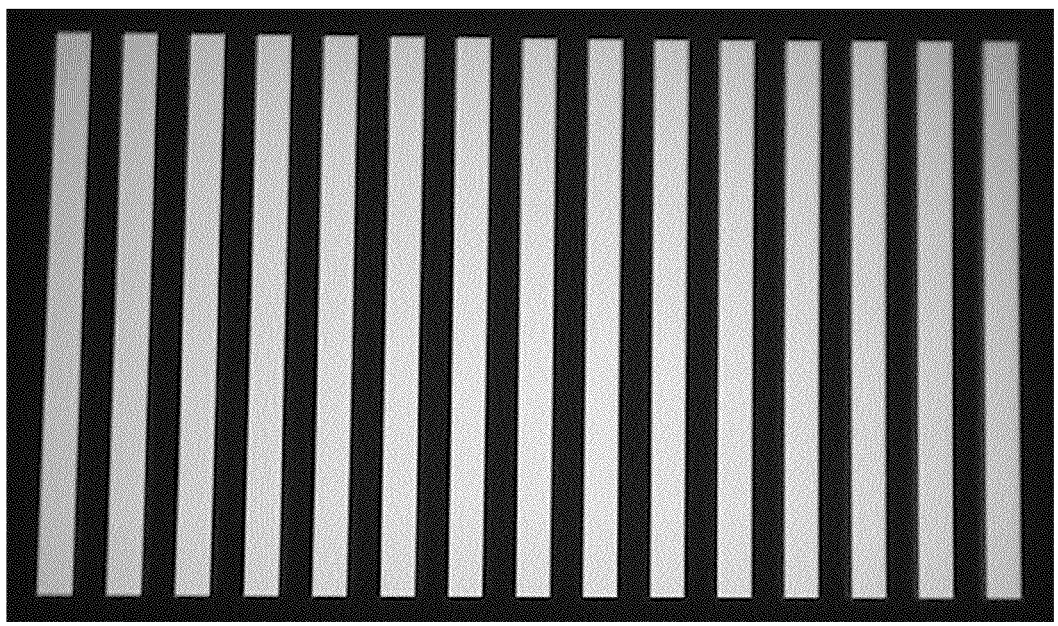
FIG. 33 shows an example of one of the Gray code images captured by a low cost web camera.

In the gray code process a number of images are projected and captured by the camera as discussed above in Section A and B with reference to FIGS. 4-11. FIG. 33 shows an example of one of the Gray code images captured by a low cost web camera.

Figure 34:
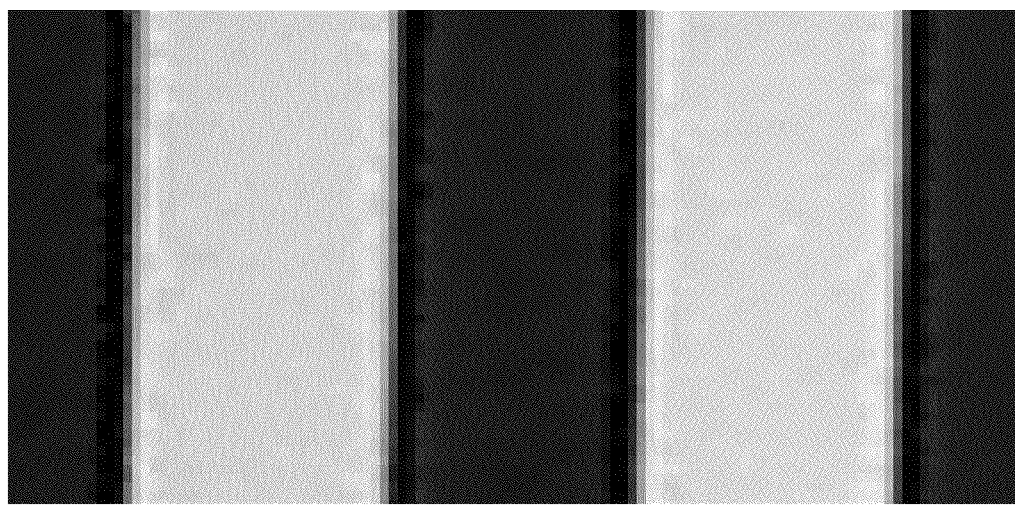
FIG. 34 is a close-up view in FIG. 33.

In the close-up view shown in FIG. 34, some of the artifacts caused by the camera are visible. In a high quality DSLR type camera, the transition from white to black is a very smooth gradient that can easily be detected with a common edge detection method. In the web camera case there is a gradient down from white to pure black with a small up gradient from the pure black to the camera's higher black point level.

Figure 35:
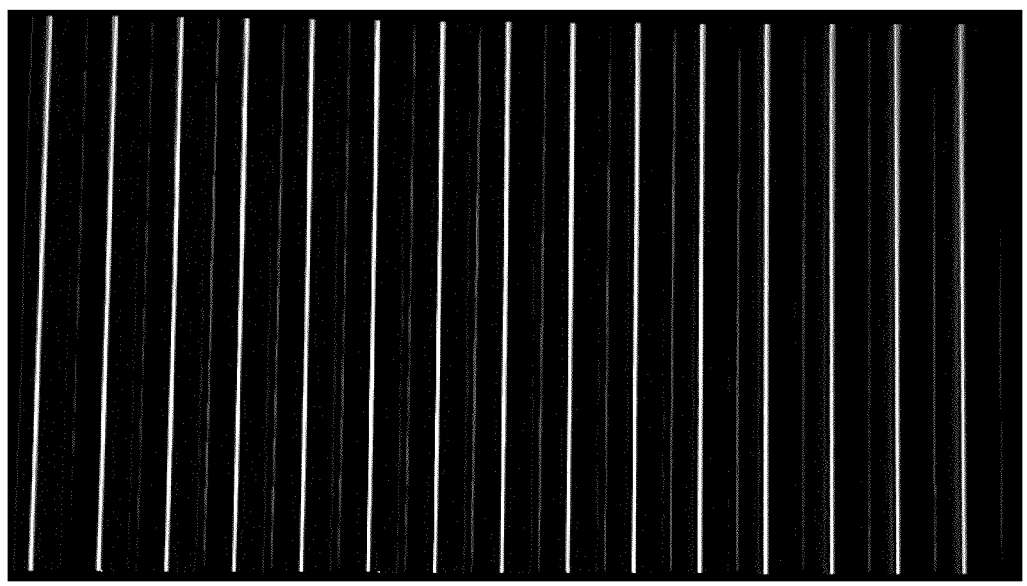
FIG. 35 shows the results of the edge detection of the left side edges of the white bands.
Figure 36:
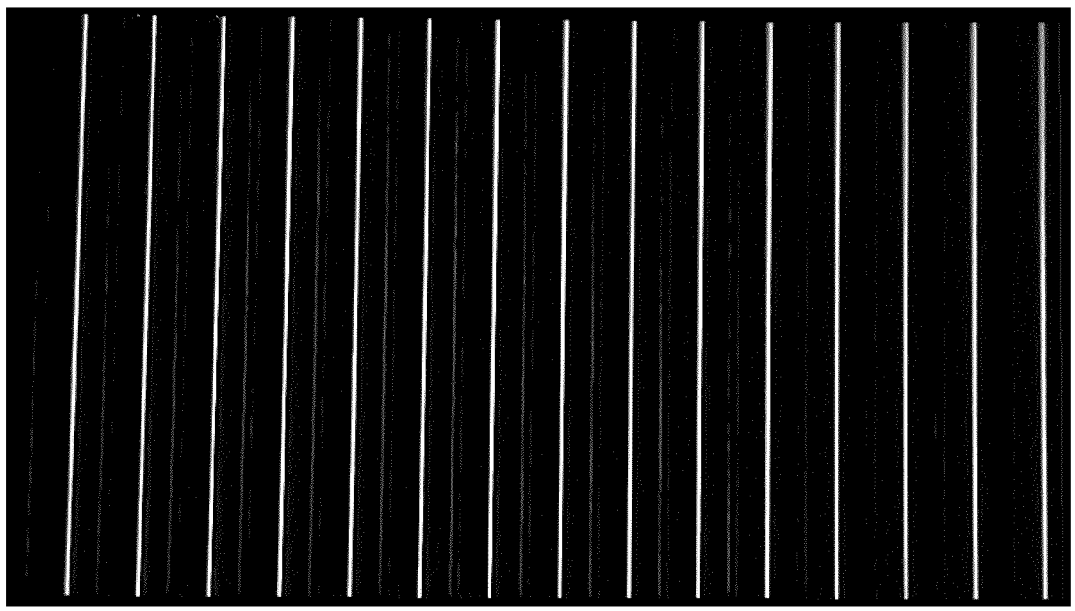
FIG. 36 shows the results of the edge detection of the right side edges of the white bands.

After the gray code image has been processed and prepared, edge detection module 212 of projector platform 106 is used to detect the left and right sides of each white band in the image, as discussed in Section A above. FIG. 35 shows the results of the edge detection of the left side edges of the white bands. FIG. 36 shows the results of the edge detection of the right side edges of the white bands.

Both FIGS. 35 and 36 show the brighter lines that are detected from the edges of the white to pure black gradient. In between the brighter lines are faint lines caused by the transition in the opposite direction of pure black to the web camera's black point level.

Figure 37:
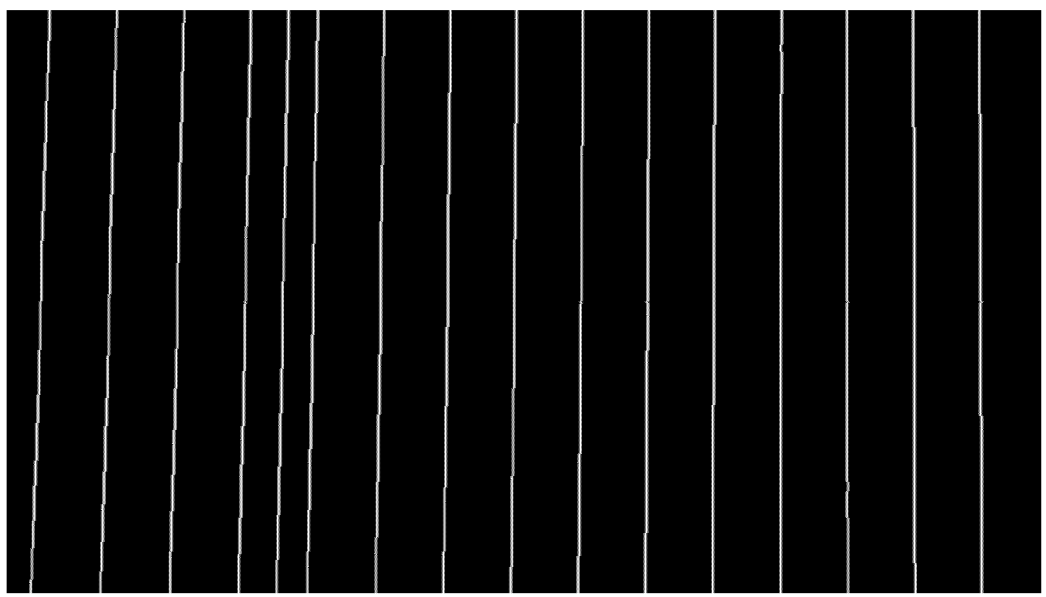
FIG. 37 shows the left side edges after enhancement.

Next the images of FIGS. 35 and 36 are processed by line enhancement module 220, discussed above in Section A. In this process noisy lines are converted to single pixel wide lines for more precision in processing Gray code and raster images used in the various calibration processes. The results of the line enhancement process are displayed in FIGS. 37 and 38. In FIG. 37 we can see the line enhancement module was unable to determine that the fifth line from the left was invalid. This was most likely caused by the relative strength of the invalid line's brightness compared with the lines in the region. While the line enhancement module has a number of safeguards and checks to avoid following invalid lines, the module must work in many environments with many different cameras so achieving 100% accuracy is not always possible. What is possible is to use additional knowledge of the overall Gray code image layout to determine what lines are invalid.

Figure 39:
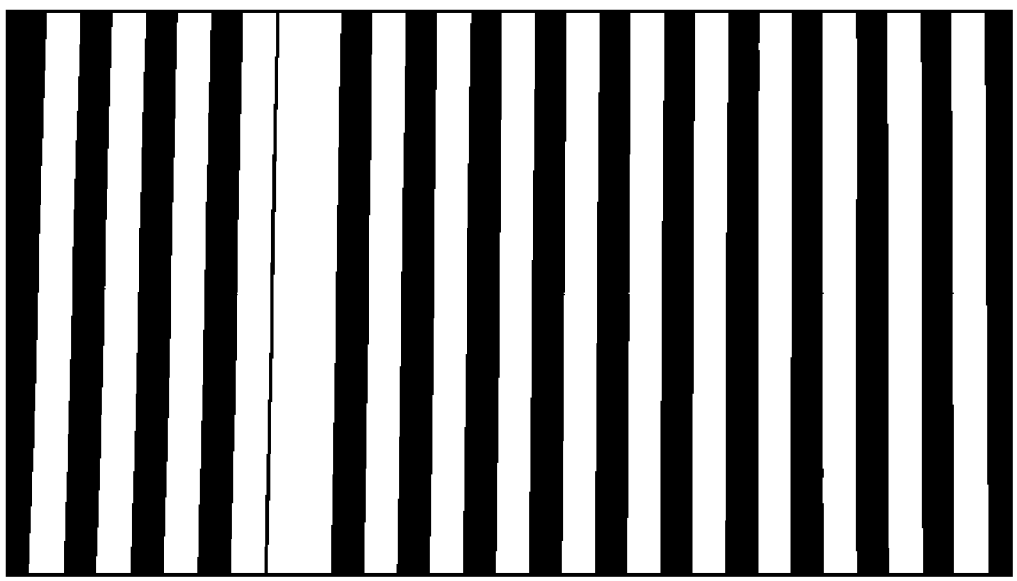
FIG. 39 shows the Gray code filled image without shadow edge removal.

If the process were to continue without the shadow edge removal aspect of the present invention, the areas between the left and right edges would be filled with the results in FIG. 39.

Comparing FIG. 39 with FIG. 33 shows an extra area filled between the fourth and fifth white bands when counting from the left edge of the image. This extra band would greatly affect the accuracy of the mapping in that region from camera to projector pixels.

In order to prevent the error displayed in FIG. 39, the shadow line removal method of the present invention uses the knowledge of the Gray code image to eliminate the invalid lines that cause the results of FIG. 39. The following will describe the process for detecting invalid vertical lines with reference to the flowchart of FIGS. 40A, 40B, and 40C. A similar process is used for detecting invalid horizontal lines.

Figure 40A:
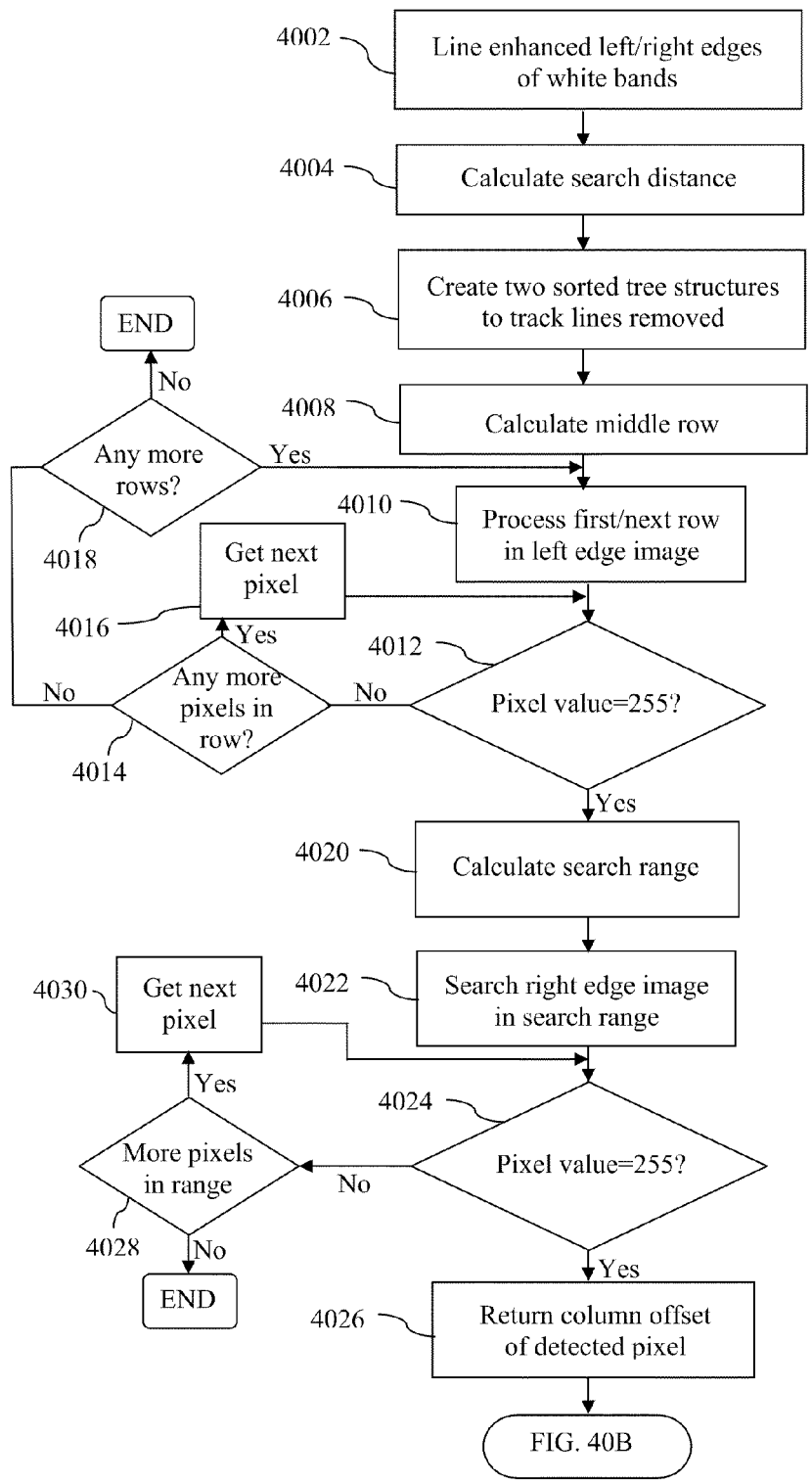
FIGS. 40A, 40B, and 40C show a process for the projector platform of FIG. 2 for removing shadow edges from Gray code images according to an embodiment of the present invention.
Figure 40B:
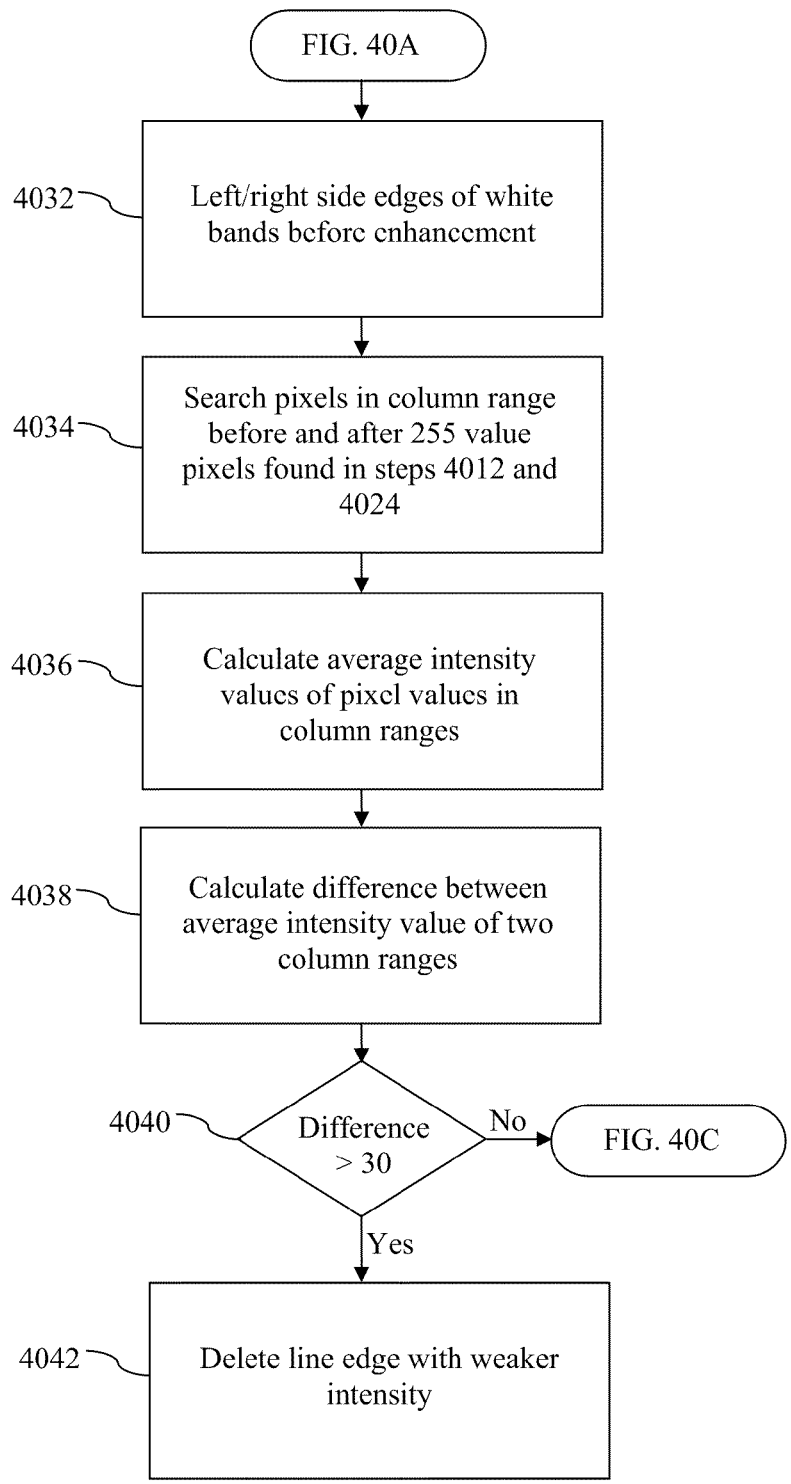

The inputs to the shadow line removal module 224 are the left and right side edges of the white bands (FIGS. 35 and 36) after processing by the line enhancement module 220 (FIGS. 37 and 38)—step 4002, FIG. 40A.

Next a search distance is calculated (step 4004) by the calling method based on the bit order of the Gray code image that affects the distance between the white bands. Lower bits have white bands closer together due to the nature of the Gray code encoding while higher bits will have white bands much farther apart. In the current system the Gray code bit is encoded into the filename of the gray code image file captured by the camera and saved to disk.

Two sorted tree structures are created (step 4006) to track lines removed during the processing as outlined in the sample code shown in FIG. 41.

The LastOffset class is declared by the example code shown in FIG. 42.

Next the middle row of the images is calculated (step 4008) and a processing loop starts from the middle row down to the bottom row (row offset=0). This is the loop through step 4018 in FIG. 40A. For each row a second processing loop processes each column from left (column=0) to right (to column=width). This is the loop through step 4016 in FIG. 40A. For each pixel in the left edge enhanced image (step 4010) the pixel is checked for a value of 255, for example, signifying a line (step 4012). Some other value could be used to detect a line and will depend on the range of pixel values in the images. In this example, the range of pixel values is 0 to 255, with 255 being the greatest value. If the pixel has the value of 255 a search range is calculated (step 4020) using the search distance specified to search the columns before and after the pixel.

If step 4012, returns No, the process checks for more pixels in the current row, i.e. column=width?, step 4014. If the answer is Yes, the next pixel is retrieved (step 4016) for examination (step 4012).

If there are no more pixels in the current row (step 4014 answers No), the process checks for more rows, i.e. row offset=0?, step 4018. If the answer is Yes, the process loops to the next row (step 4010). If the answer is No, the process ends.

Following step 4020, the right edge enhanced image is searched through the range of columns in the given row (step 4024). If a pixel with value of 255 is detected (step 4024 returns Yes) the search returns the column offset of the detected pixel. If step 4024 returns No, a check is made for more pixels in the range (step 4028). If the answer is Yes, the next pixel is retrieved (step 4030) for examination (step 4024). If there are no more pixels in the range (step 4028 returns No), the process ends.

If the process gets to step 4026, the system has an indication of an invalid line because pixels were detected in both the left edge enhanced image and the right edge enhanced image within the selected range. The search distance is determined based on the original Gray code images. It is set conservatively so that the search finds a line in the right edge enhanced image that is unexpectedly close to the line found in the right edge enhanced image. With the search distance set very conservatively, any detected pixels signifying a line in both images are assured to be an error condition.

The next step is to determine which line is in the respective images is invalid.

Figure 38:
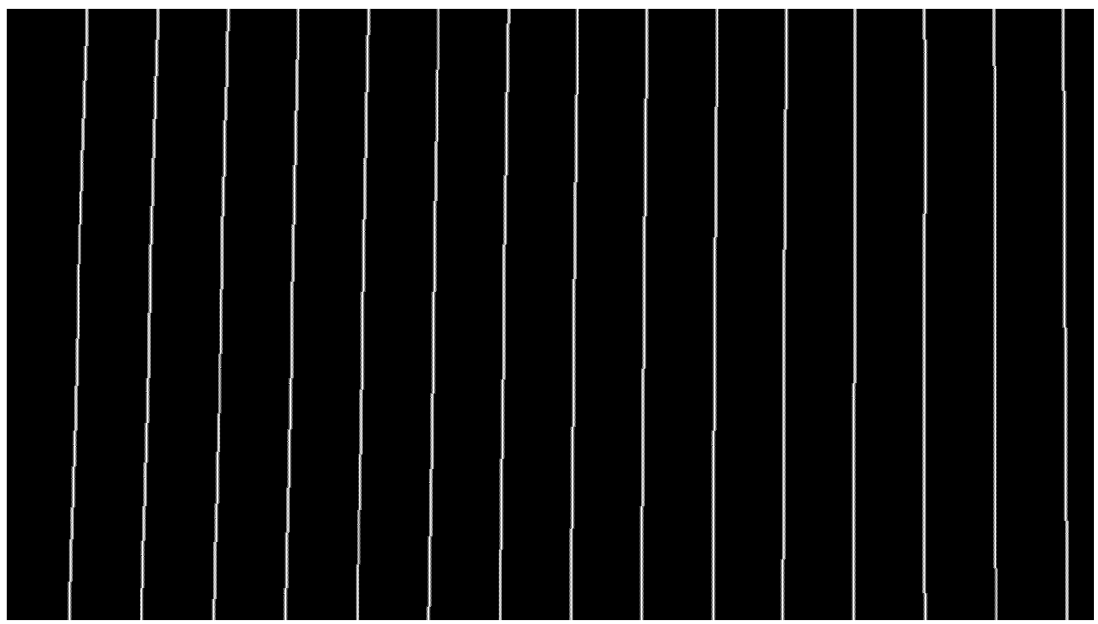
FIG. 38 shows the right side edges after enhancement.

Using the images in FIG. 35 (left side edges of white bands) and FIG. 36 (right side edges of white bands) (step 4032, FIG. 40B), the present invention searches these images in a small range before and after the columns where the pixels of value 255 were detected (step 4034) in the respective images in FIG. 37 (left side edges after enhancement) and FIG. 38 (right side edges after enhancement). Referring back to FIG. 40A, the pixel value of 255 was detected (i.e. line detected) in FIG. 37 in step 4012, and the pixel value of 255 was detected (i.e. line detected) in FIG. 38 in step 4024.

An average of the intensity values of the pixels in each these two column ranges (one range for each of the two 255 pixels) is calculated (step 4036). The difference of the average intensity value of the two ranges is then calculated (step 4038). If the difference is great (step 4040 returns Yes), the line with the weaker intensity value is determined to be invalid and that line is deleted (step 4042). It will be appreciated that this process is performed on a pixel basis. So, an invalid line is deleted pixel by pixel as the process progresses row by row.

Figure 40C:
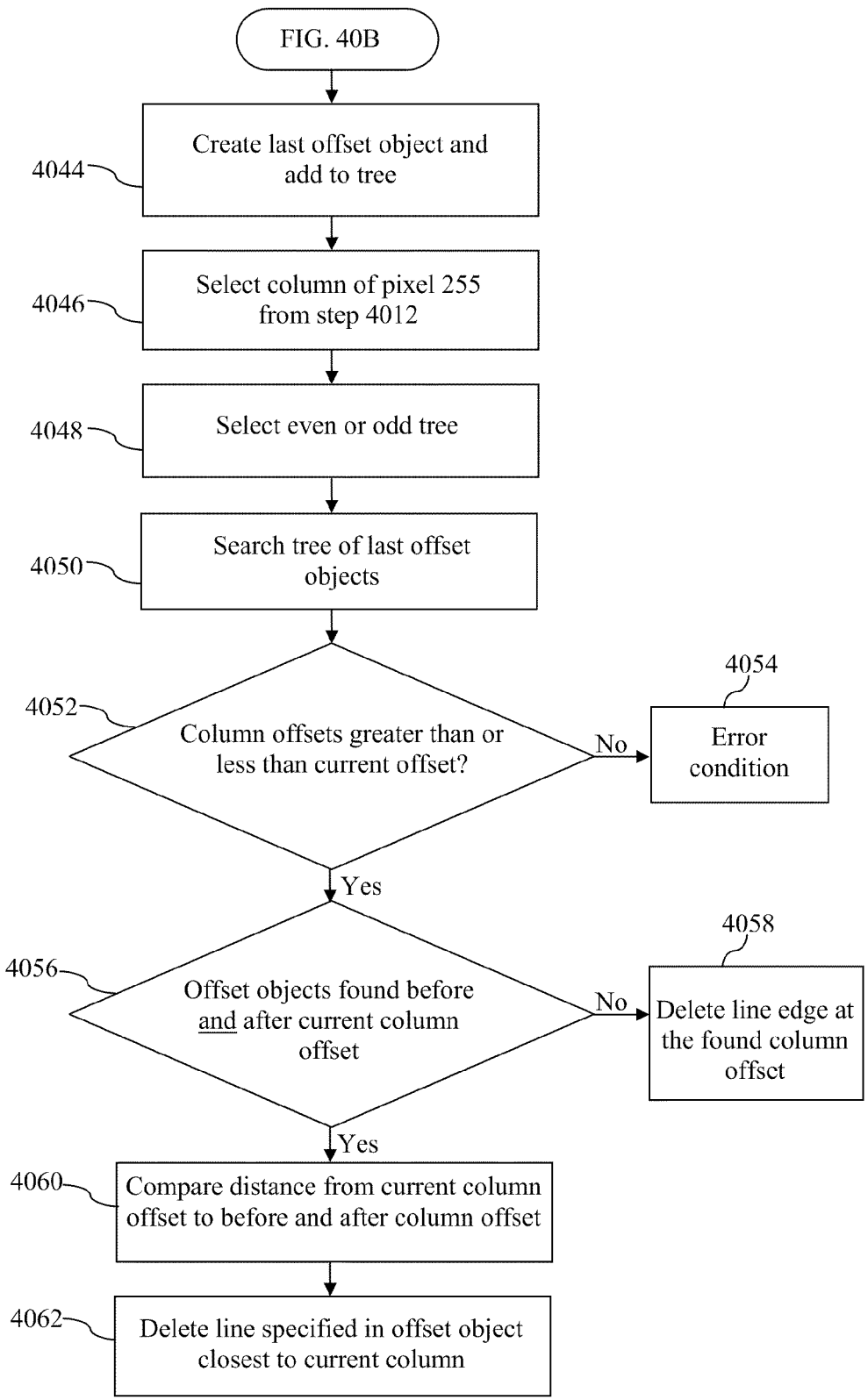

If this difference is very small, for example, 30 or less in a range of 0 to 255 (step 4040 returns No), there are two regions of equal strength which is rare so the process must look for additional clues to determine which line is invalid (FIG. 40C).

As each line is processed a LastOffset object is created for each line point processed where two lines were discovered and the action taken, and the LastOffset object is added to the proper trees lastLineEven and lastLineOdd depending on whether the current row is odd or even (step 4004).

The process next calls the method findEdgeToErase( ) which is performed by the example code shown in FIGS. 43A and 43B, to help determine which of the lines of similar intensity is invalid. In this method the system uses the past actions stored in the sorted trees lastLineEven and lastLineOdd to determine which line is invalid.

First the column where the pixel of 255 was found in FIG. 37 (result of step 4012) is passed to the method (step 4046). Next the appropriate tree is selected based on the whether the previous row is odd or even (step 4048). Using this tree a search is done to find LastOffset objects that have column offsets greater than or less than the current column offset (step 4050). If no objects are found (step 4052 returns No) there is an error condition (step 4054). If a previous (before) offset object is found or (but not and) when an offset greater than (after) the current column is found (step 4056 returns No), the line edge at the offset that was found (before or after) is erased.

If offset objects are found before and after the current column offset (step 4056 returns Yes), the process determines which line should be erased. The distance from the current column to each of the before and after object columns is compared (step 4060). Then, the line edge specified in the offset object closest to the current column is erased (step 4062).

Once the process has determined which line is invalid, the pixel in the row/column corresponding to that line is removed from the appropriate image. After the processing loop for each line (all pixels in rows/columns corresponding to the line) is completed, the tree structure for odd lines is cleared after every even line is processed and the tree structure for even lines is cleared after every odd line is processed.

Figure 44:
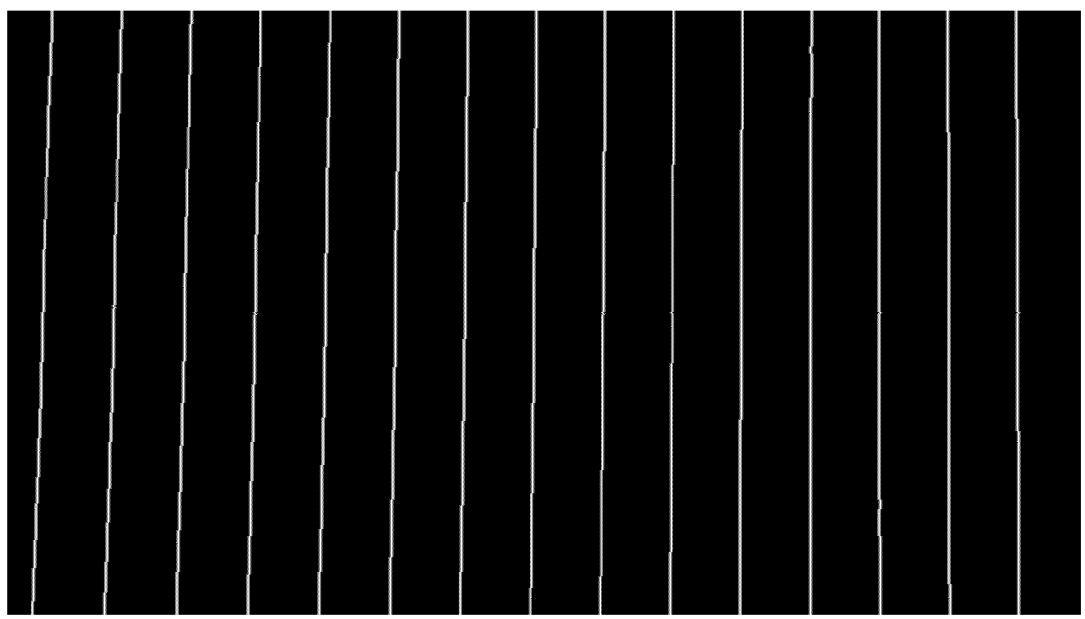
FIG. 44 shows the result of processing the image of FIG. 37 with the shadow edge removal embodiment of the present invention.

After row=0 is reached the odd and even tree structures are cleared and a second processing loop is started from the middle row up to the top row (row=height). When this loop has completed, the shadow lines have been removed from FIG. 37 with the results shown in FIG. 44. The main column processing loop is shown in the example code in FIG. 45.

Figure 46:
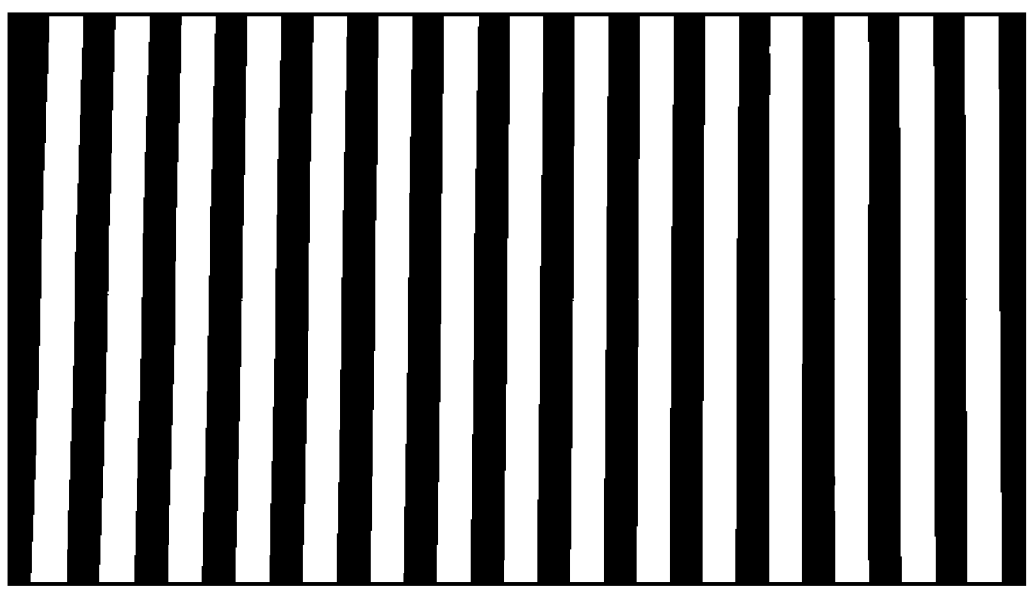
FIG. 46 shows the Gray code results using the shadow edge removal embodiment of the present invention.

As a result of the forgoing shadow edge removal process, the stray line seen in FIG. 37 has been removed with the final Gray code results shown in FIG. 46.

D. Calibrating High-Resolution Multi-Projector System with Low Resolution Cameras As discussed in the previous sections, the key function of the VPM is to map projector coordinates to camera coordinates. In Section A above, the process discussed using a combination of Gray code encoded images and raster images to map every projector pixel to one or more camera pixels. This approach required a high resolution camera with enough pixels such that there was at least one camera pixel mapping to every projector pixel for each projector in the camera's field of view for the best quality. With projectors now at a 1920×1080 resolution the camera requirements became very high. While the system would still work with a lower quality camera, the results were not as good. In a recent embodiment of the present invention, the ratio of camera resolution to projector resolution became even more severe because this recent embodiment uses a very low cost web camera.

The embodiment of the present invention discussed in this section focuses on a "Quick" version of the multi-projector system that could be quickly and easily configured for temporary use such as a meeting or presentation in a smaller conference room. The "Quick" system supports a maximum of two projectors attached to a PC running Microsoft Windows XP or Vista and calibrated with a simple web camera. The requirements for the web camera are quite low, e.g. a web camera with a 640×480 resolution.

The key component of our multi-projector calibration process is the Virtual pixel map (VPM) that is created to map the camera pixels to the projector pixels. The VPM is created after capturing the calibration images, processing the images, extracting features from the images, and finally creating a compact mapping of the projector to camera pixels. The VPM is then used by the player components, e.g. media player 108, that process input video and image frames inside a Graphics Processing Unit (GPU) to modify the image so it appears correct when projected on the wall. In an embodiment described in detail in commonly assigned U.S. patent application Ser. No. 12/549,011, Gray code and raster images are used to encode the address of each projector pixel. The camera 114 captures these images and the projector platform 106 decodes the address to create a mapping between camera and projector pixels. As the raster images are single pixel lines spaced sixteen pixels apart, the camera requires enough resolution for the system to accurately decode the location of each line.

In the embodiment discussed in this section, a homography based approach is used to create the mapping between camera pixels and projector pixels. Homography is described as a "general plane to plane projective transformation" that allows creation of a mapping between the projector and camera planes. The advantage to using homography is that it allows the input of a limited number of camera/projector point pairs to create a mapping for every projector point. Homography has the limitation that the projector surface must be a plane whereas the Gray code approach can be used on curved or distorted surfaces.

In the present embodiment, each projector 102 projects seven images each for the vertical and horizontal dimensions (total 14 images). Any number of images can be used but seven images seems to offer the best results in terms of calibration time versus projector to camera pixel mapping accuracy. The width and height of the projector resolution are divided into seven divisions. The projector 102 then projects an image with a single line for each division in both dimensions. The camera 114 captures these images and saves the images to disk with a file name that includes the offset of the line projected.

Once the 14 images have been captured and saved, projector platform 106 next finds the bounding region for each projector in the camera field. The captured images are cropped to this bounding region. Projector platform 106 next processes the images by identifying and enhancing the line found in each calibration image using image processing module 210 including edge detection module 212 and enhancement module 220, discussed above in Section A. The output of this process is a cropped image with an enhanced line that can be easily identified.

Figure 47:
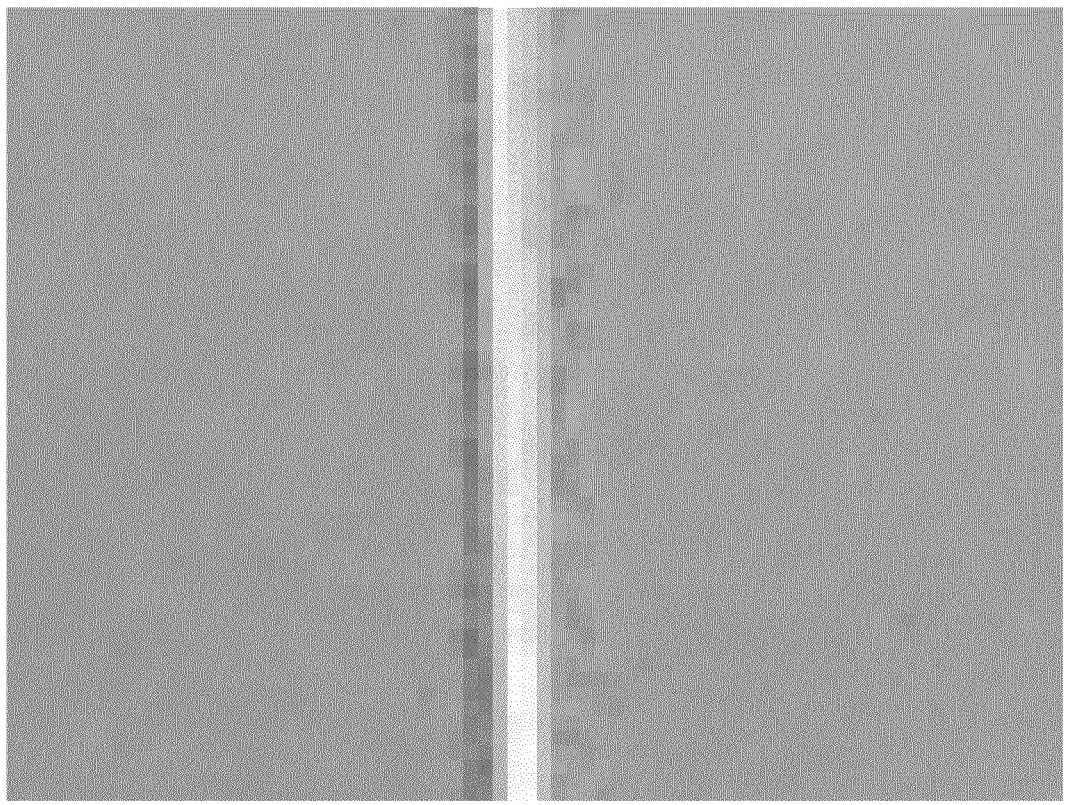
FIG. 47 is a close-up view of a calibration image captured with a web camera.
Figure 48:
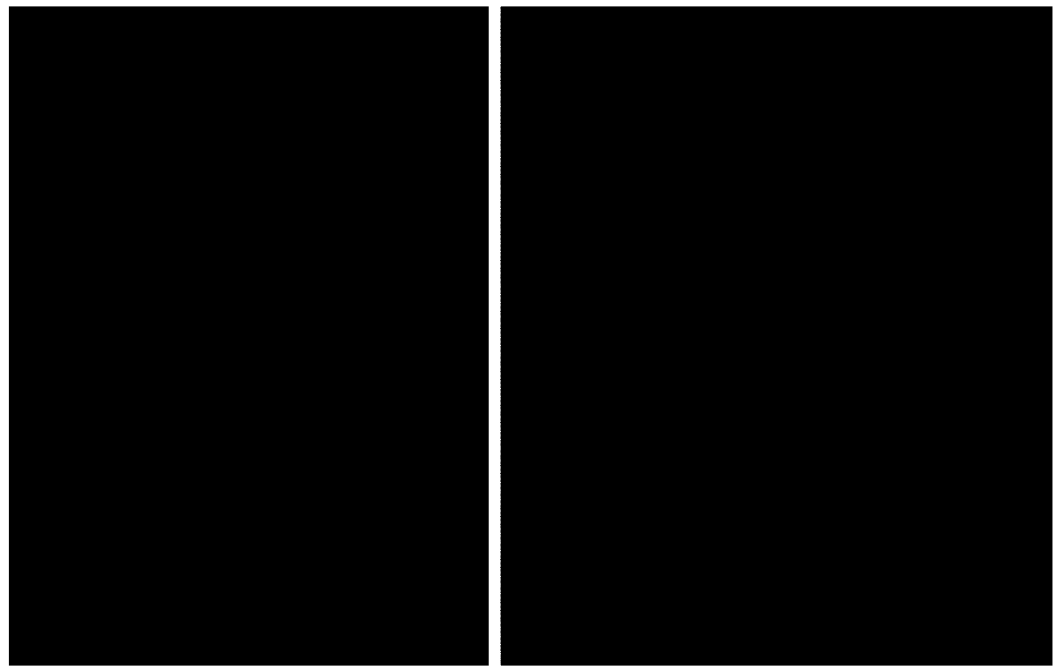
FIG. 48 shows the close-up results of line enhancement processing of FIG. 47.

FIG. 47 shows a close-up of a line captured from a relatively good quality web camera. Noise, color shifts and wide gradients on the edges can be seen. With other cameras the distortion can be much worse. FIG. 48 shows the line after processing with the line enhancement module 220. Line enhancement helps increase the accuracy of the homography process as the line enhancement module 220 identifies the brightest path along the line. The line in FIG. 47 is nearly eight pixels wide and the standard approach of thresholding results in a ragged line that does not always follow the best path as the brightness of the projector images varies greatly such as areas along the edges due to light falloff.

Figure 49A:
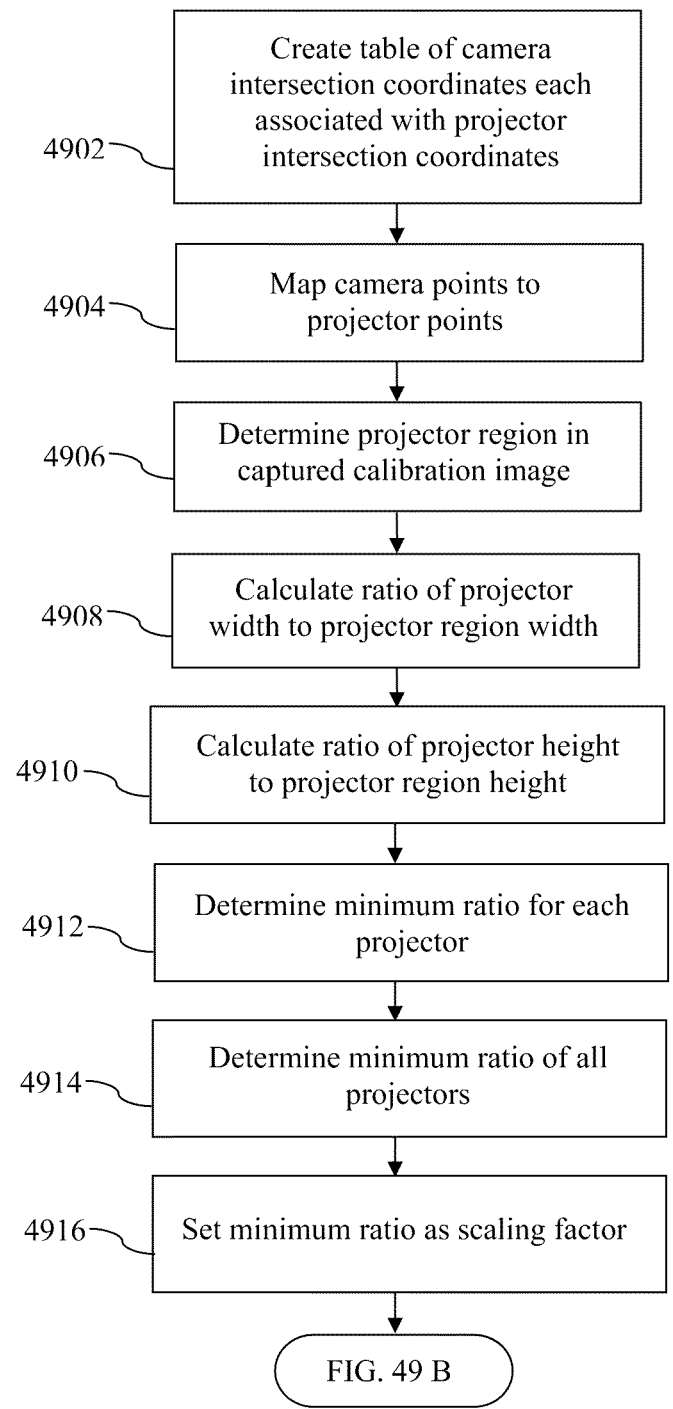
FIGS. 49A and 49B show a process for the projector platform of FIG. 2 for scaling (increasing the resolution) of the input camera image to better match the output projector image according to an embodiment of the present invention.
Figure 49B:
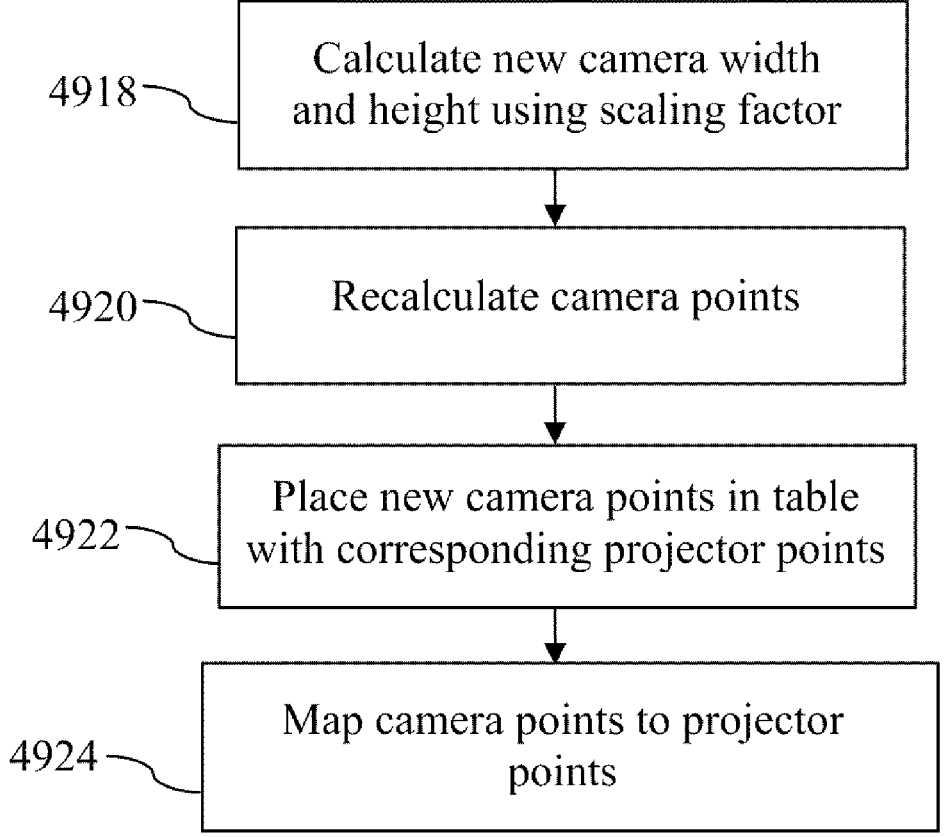

The process of this presently discussed embodiment is shown in FIGS. 49A and 49B. The calibration images are captured and enhanced as discussed in one or more of the embodiments discussed in Sections A, B, and/or C above. Once all the calibration images have been enhanced, the projector platform 106 next identifies the intersection of the 49 points (7 horizontal lines×7 vertical lines). Projector platform 106 creates a table of the 49 camera intersection coordinates each associated with 49 projector intersection coordinates using the projector offsets that have been extracted from the filename of the saved captured images (step 4902). This table provides an initial mapping between 49 camera points and projector points. What is needed next is the mapping for all projector points so that there is enough information to complete the VPM.

Using any conventional mapping technique, correspondence module 206 creates a camera point mapping for every projector point to represent the homography between the camera and the projector (step 4904). In the case of a very low resolution web camera there may be 640 camera points in the width mapping to 1920 projector points. In the height there may be 480 camera points mapping to 1080 projector points. The camera dimension defines the input image size of the VPM, while the output image size is the size of the projector dimension. When the sizes vary greatly, the quality of the output projected suffers as each projector pixel is sharing up to three camera pixels in the width dimension. The causes the projected output to have a block like appearance.

To improve the projected output quality, the process of the present invention must increase the resolution of the input image to the VPM during the calibration process. The present invention supports two modes of operation:

Super Bright. In this mode two projectors are overlapped to create a single bright image.

Super Wide. Two projectors are placed side by side with a slight overlap to create a larger projected image.

In the super bright mode we do not have to calculate a blending ramp as the projectors completely overlap. For the super wide we must create two blending ramps for each projector to create one seamless image.

The homography using the camera coordinates identified in the original calibration images (step 4904) gives a mapping from the low resolution camera coordinates to the high resolution projector coordinates. In memory, a TPrimal object is created to hold the Virtual Pixel Mapping (VPM) in memory. The TPrimal object has the data members shown in the example code in FIG. 50

The element matrix of the VPM contains the total number of projector pixels. Each element in the matrix has the data members shown in FIG. 51.

Each element in the matrix contains the projector point which it represents along with one or more camera points mapped to the projector point. The camera points have the data members shown in FIG. 52.

Thus, there is a TPrimal object in memory with every projector pixel having one mapped camera coordinate. Next, projector platform 106 will examine the layout of the projectors and decide if a blending ramp should be created. For example, referring to FIG. 1, projectors 102D and 102B overlap in area 124C of the composite projected image. If so, the projector masks are processed to create ramps where the two projectors overlap. An intensity value is calculated for each camera pixel in the blending ramp so the output of the two projectors can be seamlessly blended.

This camera pixel information is then processed to find the corresponding projector pixels. The projector pixels that include this camera pixel are updated with the intensity value needed for the blending ramp. This process uses the low resolution camera coordinates to projector coordinates mapping to set up the projector pixel attributes with the most accurate mapping. Also, the initial processing modules can use the low resolution camera values in processing to avoid having to recalculate needed values with the scaling factors (described hereinbelow), simplifying the code.

Projector platform 106 next calculates the camera image scale factor needed for the best output quality. To calculate the scale factor the size of each projector region in the captured calibration images is determined by projector platform 106 (step 4906). For example, referring to FIG. 1, projector 102D projects onto projector region 120D. This will occupy a portion of the composite image 122 captured by camera 114.

Next, for each projector the projector width (in pixels, e.g. 1920) to projector region width (in pixels in the captured image) ratio is calculated (step 4908). Similarly the projector height to projector region height ratio is calculated (step 4910). The projector platform 106 then determines the minimum ratio of the width and height ratios for each projector (step 4912). Next the minimum ratio for all projectors is determined (step 4914). This ratio is then set as the scaling factor for the scaled camera width and height for all projectors (step 4916).

The projector platform 106 then calculates a new camera width and height using the scaling factor (FIG. 49A, step 4918) and updates each projector's data structure with these values as discussed below.

After the scaled camera width and height values are calculated, the original detected camera points from the calibration images are recalculated using the scale factor (step 4920). These new camera points are placed in the table with the corresponding projector points (step 4922). In other words the table originally created in step 4902 is recreated with the new, scaled camera points. Again, using any conventional mapping technique, correspondence module 206 creates a camera point mapping for every projector point to represent the homography between the camera and the projector using the scaled camera point data (step 4924). In this case, depending on the arrangement of the projectors, the result is a camera width closer to 1920 being mapped to the projector width of 1920, and same for the height.

Using the mapping table output from the correspondence module 206, the projector platform iterates through every pixel of the TPrimal object in memory, as set forth in example code shown in FIGS. 53A and 53B.

For every projector pixel, the mapping to the camera point is calculated by the correspondence module 206. This new camera point is used to replace the camera point previously calculated with the low resolution camera size. The previously calculated blending ramp intensity value is preserved. Once every projector point is updated with the scaled camera point coordinate, the VPM is saved to disk.

In addition to the VPM, a data file is saved with information necessary for the playback modules to understand the projector arrangement. This information includes the size of the projector region in the camera image, the size of the camera image, and the upper left corner offset of the projector region in the camera region. These values are scaled using the scaling factor before saving the information to a file.

Figure 54:
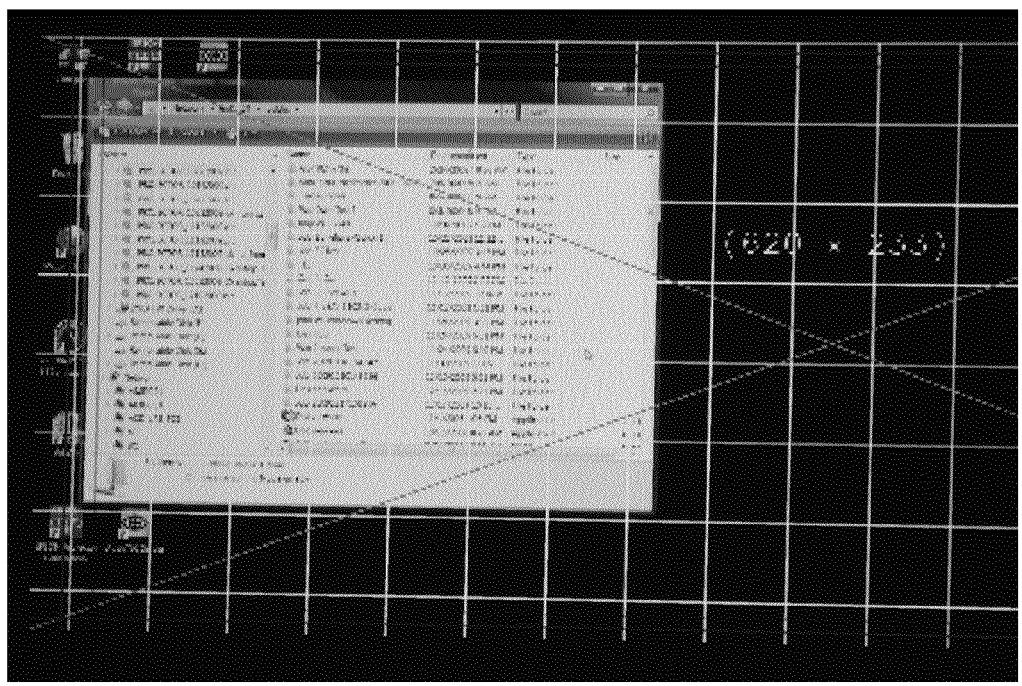
FIG. 54 shows the results of the calibration process without the scaling process of an embodiment of the present invention.
Figure 55:
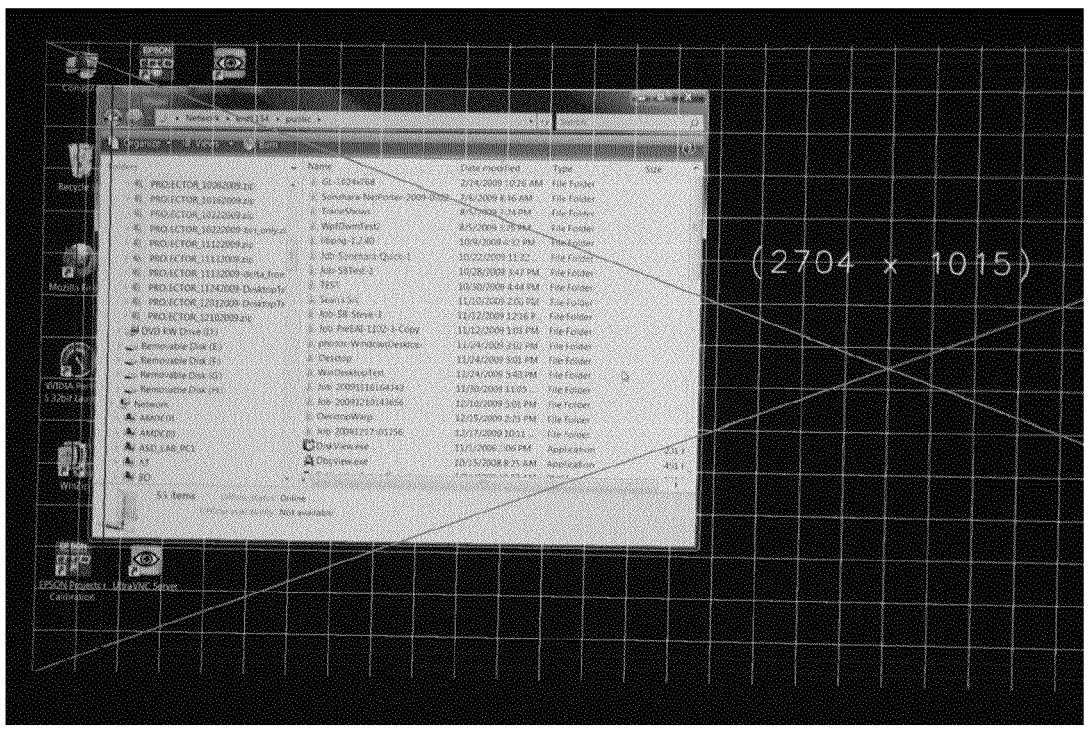
FIG. 55 shows the results of the calibration process with the scaling process of an embodiment of the present invention.
Figure 56:
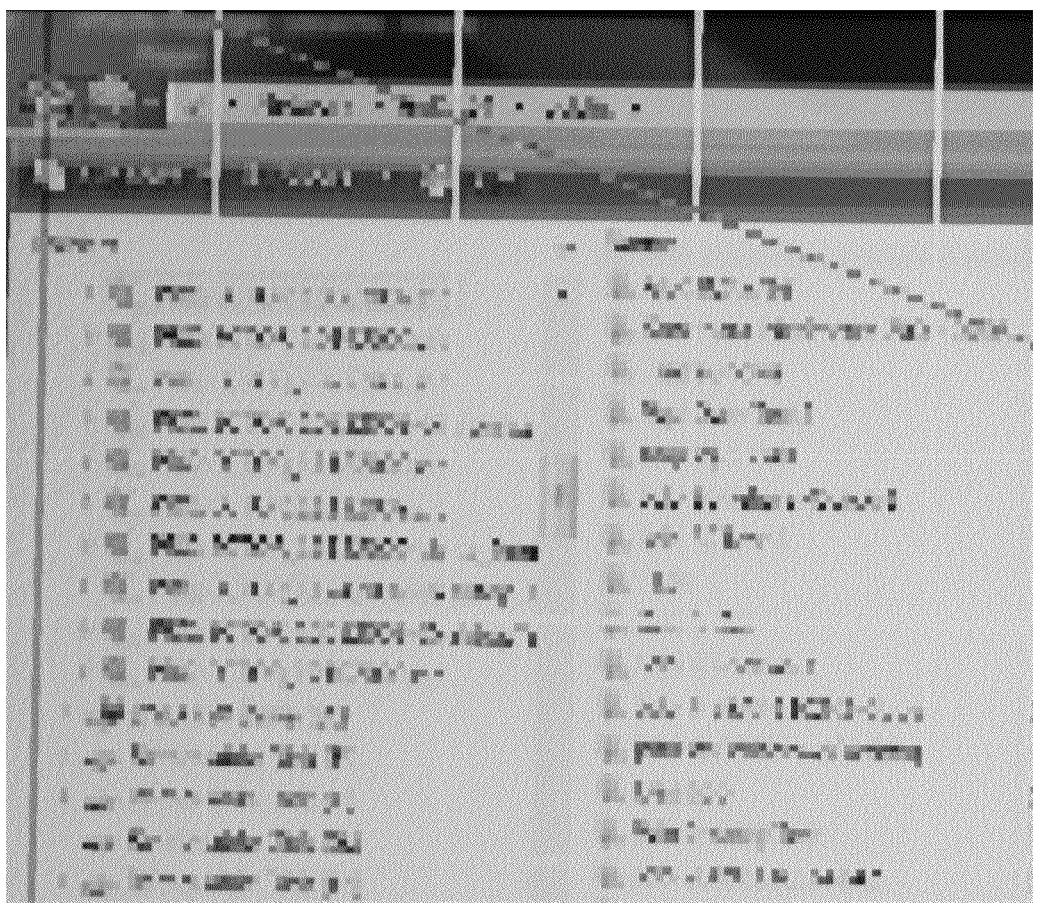
FIG. 56 is a close-up view of the unscaled projector image.
Figure 57:
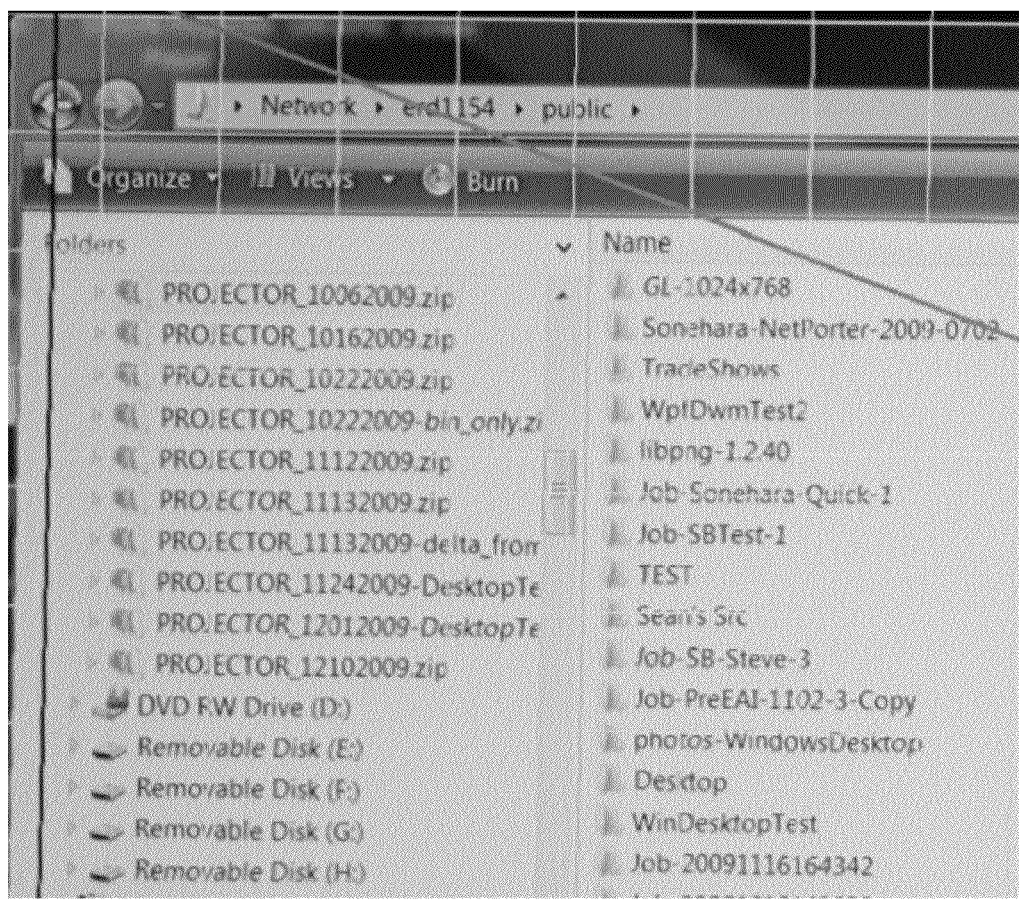
FIG. 57 is a close-up view of the unscaled projector image.

The results of the scaling procedure described above can be seen by comparing FIG. 54 to FIG. 55. FIG. 54 shows the results of a calibration process using a web camera with a resolution of 640×480 without scaling the VPM. In this case many projector pixels are sharing the same camera pixel as the difference between the camera resolution and projector resolution is great. FIG. 55 is the same configuration but the VPM has been scaled. In FIG. 54 the bounding box of the maximum display area can be seen as 622×233 which is slightly less that than resolution of the web camera. In FIG. 55, the bounding box of the maximum display area has been scaled to 2704×1015 which is more than four times large than the resolution of the web camera. FIGS. 56 and 57 show close-up views of the unscaled and scaled output, respectively. In summary, in this aspect of the invention, a scaling factor is calculated based on the relative height/width of projector regions in the captured calibration images. Calibration images are recalculated using the scale factor to provide greater correspondence between the mapping of a low resolution camera to the high-resolution projectors.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method comprising:
receiving a first image, wherein the first image includes a plurality of substantially parallel first stripes, wherein the first image conforms to a virtual display space, and wherein the virtual display space comprises a first plurality of first pixel locations;
projecting the first image from a projector onto a surface, wherein the projector is described by a projector space comprising a second plurality of second pixel locations;
capturing with a camera a second image of the first image projected onto the surface, wherein the second image conforms to the virtual display space and the first plurality of first pixel locations each has a corresponding camera coordinate value;
examining rows or columns in the second image to determine a start and an end of Gray code values;
modifying the second image based upon the examining of the rows or columns to create a modified second image; and
mapping one Gray code value or a list of Gray code values in the modified second image to each of a plurality of the camera coordinate values.

2. The method as in claim 1, further comprising:
using the mapping to create x and y projector matrices; and
creating a list of a plurality of projector points mapped to a current camera location.

3. The method as in claim 2, further comprising:
creating a list of x,y projector matrices;
accessing the x and y projector matrices for a current camera location;
checking one or more Gray code values in each x and y location in each respective x and y projector matrix; and
if a respective x location and a y location each has a single Gray code value, then creating a projector point for the respective x and y location with the single Gray code value, and
if a respective x location and a y location each has a plurality of Gray code values, then creating a list of projector points for the respective x and y location with the plurality of Gray code values.

4. The method as in claim 3, further comprising:
iterating through a plurality of the projector points setting x an y values in the corresponding x and y projector matrices with a current camera coordinate.

5. The method as in claim 1, wherein modifying the second image comprises:
extending Gray code values in columns up to a top edge or down to a bottom edge of the second image to create the modified second image.

6. The method as in claim 1, wherein modifying the second image comprises:
removing single pixel changes in Gray code values in the second image.

* * * * *